United States Patent
Reshef et al.

(10) Patent No.: US 9,408,063 B2
(45) Date of Patent: Aug. 2, 2016

(54) JURISDICTION-BASED ADAPTIVE COMMUNICATION SYSTEMS AND METHODS

(71) Applicant: Intel Corporation, Santa Clara, CA (US)

(72) Inventors: Ehud Reshef, Kiryat Tivon (IL); Wilfrid D'Angelo, Mougins (FR); Wilfrid Lefevre, Valbonne (FR); Liraz Zur, Haifa (IL); Nevo Idan, Zichron Ya'akov (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/486,847

(22) Filed: Sep. 15, 2014

(65) Prior Publication Data

US 2016/0080929 A1 Mar. 17, 2016

(51) Int. Cl.
*H04W 48/16* (2009.01)
*H04W 8/18* (2009.01)

(52) U.S. Cl.
CPC ...................................... *H04W 8/183* (2013.01)

(58) Field of Classification Search
CPC ..... H04W 12/06; H04W 88/06; H04W 48/16; H04W 48/17; H04W 48/18; H04W 48/20
USPC ........ 455/410, 411, 422.1, 432.1, 433, 435.1, 455/435.2, 456.6
See application file for complete search history.

(56) References Cited

U.S. PATENT DOCUMENTS

| | | | |
|---|---|---|---|
| 2003/0032434 A1 | 2/2003 | Willner et al. | |
| 2009/0023458 A1 | 1/2009 | Mountney | |
| 2010/0284337 A1 | 11/2010 | Luft et al. | |
| 2013/0303232 A1* | 11/2013 | Thomas | H04W 52/146 455/550.1 |
| 2014/0028437 A1 | 1/2014 | Majid et al. | |
| 2014/0213288 A1 | 7/2014 | Dupray et al. | |
| 2015/0071268 A1* | 3/2015 | Kennedy | H04W 8/08 370/338 |

FOREIGN PATENT DOCUMENTS

EP 2663101 A2 11/2013

OTHER PUBLICATIONS

International Search Report and Written Opinion mailed Nov. 23, 2015 for International Application No. PCT/US2015/041529, 12 pages.

* cited by examiner

*Primary Examiner* — Kevin Kim
(74) *Attorney, Agent, or Firm* — Schwabe, Williamson & Wyatt, P.C.

(57) ABSTRACT

Embodiments of systems and methods for jurisdiction-based adaptive communication are disclosed herein. In some embodiments, a wireless device may be configured to store different jurisdiction identifiers, each jurisdiction identifier in association with a stored set of wireless communication operation constraints. In some such embodiments, the wireless device may receive a jurisdiction identifier nominally representative of a jurisdiction in which communication hardware of the wireless device is located, and may validate or invalidate the received jurisdiction identifier. If the received jurisdiction identifier is validated, the wireless device may apply the stored set of wireless communication operation constraints corresponding to the received jurisdiction identifier to adapt the operation of the communication hardware of the wireless device. Other embodiments may be disclosed and/or claimed.

29 Claims, 8 Drawing Sheets

| JUR ID | WIRELESS COMM. OPERATION CONSTRAINTS |
|---|---|
| USA | Prohibited_Freq_Band=... |
| JP | Allowed_Freq_Band=... |
| AU | Maximal_Transmit_Power_In_Channel1=... |
| FR | Prohibited_Freq_Band=... |

FIG. 5

| JUR ID | DEFAULT WIRELESS COMM. OPERATION CONSTRAINTS |
|---|---|
| INVALID | Prohibited_Freq_Band=... |

FIG. 6

| TRUSTED LOCATION PROVIDER ID | KEY |
|---|---|
| GeoSat 1 | A4C227B... |
| Local_OS | FF7803F... |

FIG. 7

| JUR ID | LOCATION-BASED JURISDICTION DEFINITIONS |
|---|---|
| USA | Corner_Coord=... |
| JP | Corner_Coord=... |
| AU | Corner_Coord=... |
| FR | Corner_Coord=... |

FIG. 8

| TRUSTED LOCATION SOURCE ID | KEY |
|---|---|
| GeoSat 1 | A4C227B... |
| AccessPoint3 | FF7803F... |

FIG. 9

JURISDICTION-BASED ADAPTIVE COMMUNICATION SYSTEMS AND METHODS

TECHNICAL FIELD

The present disclosure relates to device communication, and more particularly, to jurisdiction-based adaptive communication.

BACKGROUND

Different countries have different regulatory requirements for wireless transmissions, and compliance with these requirements may be necessary for lawful operation within the country. To accommodate these different regulatory requirements, conventional wireless devices are configured to operate in accordance with the "lowest common denominator" requirements in order to achieve compliance with all likely jurisdictions, or when permitted, the devices may dynamically receive sets of regulatory requirements when operating in a particular jurisdiction.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 5 depicts a memory structure that may hold jurisdiction identifiers and associated sets of wireless communication operation constraints, in accordance with various embodiments.

FIG. 6 depicts a memory structure that may hold an invalid jurisdiction identifier and an associated set of default wireless communication operation constraints, in accordance with various embodiments.

FIG. 7 depicts a memory structure that may hold trusted location provider identifiers, in accordance with various embodiments.

FIG. 8 depicts a memory structure that may hold jurisdiction identifiers and associated location-based jurisdiction definitions, in accordance with various embodiments.

FIG. 9 depicts a memory structure that may hold trusted location source identifiers, in accordance with various embodiments.

DETAILED DESCRIPTION

Figure 1:
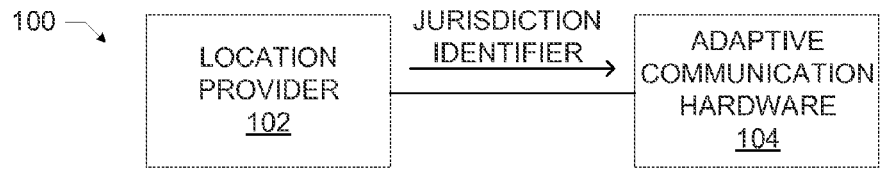
FIG. 1 is a block diagram of an adaptive communication system, in accordance with various embodiments.

Embodiments of systems and methods for jurisdiction-based adaptive communication are disclosed herein. In some embodiments, a wireless device may be configured to store multiple different jurisdiction identifiers, each jurisdiction identifier in association with a stored set of wireless communication operation constraints. In some such embodiments, the wireless device may receive a jurisdiction identifier nominally representative of a jurisdiction in which communication hardware of the wireless device is located, and may validate or invalidate the received jurisdiction identifier based on whether the received jurisdiction identifier corresponds to one of the stored jurisdiction identifiers. In some embodiments, the system may store an identifier of one or more trusted location providers, and may validate or invalidate the received jurisdiction identifier based on whether the received jurisdiction identifier was provided by a trusted location provider. If the received jurisdiction identifier is validated, the wireless device may apply the stored set of wireless communication operation constraints corresponding to the received jurisdiction identifier to adapt the operation of the communication hardware of the wireless device.

In some embodiments, the wireless device may be configured to store multiple different jurisdiction identifiers, each jurisdiction identifier in association with a stored location-based jurisdiction definition, and to store an identifier of a trusted location source. In some such embodiments, the wireless device may receive location data nominally representative of a location at which communication hardware of the wireless device is located, and may validate or invalidate the received location data based on whether the received location data was provided by the trusted location source. If the received location data is validated, the wireless device may cause the provision of a jurisdiction identifier corresponding to the received location data (based on the stored location-based jurisdiction definitions) to the communication hardware of the wireless device for use by the communication hardware to adapt its operation.

Various ones of the embodiments disclosed herein may enable computing devices that do not have ready access to location information to comply with the different wireless communication regulations of different countries in other jurisdictions. In cellular networks, service providers may broadcast their identity and location such that nearby cellular devices can use this information to comply with regulatory requirements (e.g., by querying a remote requirements database). However, other wireless transmission protocols, such as Wi-Fi and Zigbee, do not typically have access to location information, even though the operation of devices in accordance with these transmission protocols may be affected by jurisdiction-based regulatory requirements. Such devices may have been designed to comply with a specific wireless standard, and may have no ready ability to comply with different sets of constraints depending upon the current location of the devices.

Consequently, such devices have conventionally been designed as "geo-specific" products; that is, a particular wireless device will be designed for compliance with the regulatory requirements of a particular jurisdiction and sold for use in that jurisdiction. This approach may be unsatisfactory in a number of ways. As an initial matter, this approach relies on the assumption that the number of devices that will travel to countries that have a conflicting set of regulatory requirements will be limited (and/or the governing bodies of the various jurisdictions will allow "traveling devices" to operate temporarily within their borders). This is not always the case, and the number of "traveling" wireless devices will only increase. Additionally, this approach requires the manufacturer to maintain a range of different products for different jurisdictions and to keep those products segregated during manufacture, storage, transportation, and distribution. Some manufacturers may decide to only produce one version of a product, and design that product to comply with a set of "lowest common denominator" requirements that satisfy the regulatory requirements of most, if not all, the jurisdictions in which the product will be used. In other words, compliance with the lowest common denominator requirements will ensure compliance with the regulatory requirements of most, if not all, the jurisdictions in which the product will be used. However, this approach may hobble device performance, and not allow devices to take advantage of improved regulatory conditions in certain jurisdictions. For example, many countries do not allow a Wi-Fi device to independently operate as a mobile access point in the 5.8 gigahertz band, but the United States permits such operation. A lowest common denominator approach would prohibit a device from ever independently operating as a mobile access point in this band, preventing the device from performing at its full capability where permitted (e.g., in United States).

Moreover, approaches that have been used for achieving regulatory compliance for cellular devices may be against the law or frowned upon by regulators when used in other types of wireless communication, such as Wi-Fi. In particular, some regulatory bodies discourage or prohibit Wi-Fi devices from querying a local access point to access the regulatory requirements in the jurisdiction at least because malicious access points may provide false information to querying devices. Instead, such regulatory bodies may require or encourage wireless devices to store the relevant regulatory requirements on the wireless device itself to minimize the potential for malicious behavior. Indeed, even if it is technically possible to configure Wi-Fi access points or other communication nodes to broadcast or otherwise transmit location-based operational constraints, many regulatory bodies specifically require that end users be prevented from modifying the regulatory constraints of their wireless devices in the field.

Disclosed herein are systems and techniques that may be used to securely provide location information to such wireless devices such that the devices can trust the location information and use it to comply with local regulatory requirements. Various ones of the systems and techniques may allow wireless devices to verify their locations and dynamically apply appropriate regulatory settings. Implementation of the various ones of the systems and techniques disclosed herein may enable manufacturers to build new products and manage their inventory with increased efficiency. In some embodiments, manufacturers and vendors may reduce operating expenses and streamline customer operations by reducing the number of regulatory requirement-driven wireless device product versions.

Additionally, various embodiments of the systems and techniques disclosed herein may enable devices to maximize their capabilities when operating in various jurisdictions. For example, allowing a device to take advantage of a higher maximal transmit power in a particular jurisdiction may enable the operating range of that device (and/or the available throughput at a given distance) to be enhanced.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A or B" means (A), (B), or (A and B). For the purposes of the present disclosure, the phrase "A, B, and/or C" means (A), (B), (C), (A and B), (A and C), (B and C), or (A, B, and C).

The description uses the phrases "in an embodiment," or "in embodiments," which may each refer to one or more of the same or different embodiments. Furthermore, the terms "comprising," "including," "having," and the like, as used with respect to embodiments of the present disclosure, are synonymous. As used herein, the term "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

FIG. 1 is a block diagram of an adaptive communication system 100, in accordance with various embodiments. In some embodiments, the system 100 may be configured to store different jurisdiction identifiers, each jurisdiction identifier in association with a stored set of wireless communication operation constraints, and to store an identifier of a trusted location provider. In some such embodiments, the system 100 may be configured to receive a jurisdiction identifier nominally representative of a jurisdiction in which communication hardware of the system 100 is located, and may be configured to validate or invalidate the received jurisdiction identifier based on whether the received jurisdiction identifier corresponds to one of the stored jurisdiction identifiers. In some embodiments, the system may store an identifier of one or more trusted location providers, and may validate or invalidate the received jurisdiction identifier based on whether the received jurisdiction identifier was provided by a trusted location provider. If the received jurisdiction identifier is validated, the system 100 may be configured to apply the stored set of wireless communication operation constraints corresponding to the received jurisdiction identifier to adapt the operation of communication hardware of the system 100. A number of such embodiments are discussed in detail below.

In some embodiments, the system 100 may be configured to store different jurisdiction identifiers, each jurisdiction identifier in association with a stored location-based jurisdiction definition, and to store an identifier of a trusted location source. Each jurisdiction identifier may be associated with a set of wireless communication operation constraints representative of legal, regulatory, technical, industry-determined, or other constraints that govern the operation of wireless devices within the jurisdiction identified by the associated jurisdiction identifier. In some such embodiments, the system 100 may be configured to receive location data nominally representative of a location at which the adaptive communication hardware 104 of the system 100 is located, and may be configured to validate or invalidate the received location data based on whether the received location data was provided by the trusted location source. If the received location data is validated, the system 100 may be configured to identify a jurisdiction identifier corresponding to the received location data (based on the stored location-based jurisdiction definitions), and may be configured to cause the provision of the jurisdiction identifier to the communication hardware of the system 100 for use by the communication hardware to adapt its operation. A number of such embodiments are discussed in detail below.

As illustrated in FIG. 1, the system 100 may include a location provider 102 and adaptive communication hardware 104. The location provider 102 may include any suitable hardware configured to provide a jurisdiction identifier (nominally representative of a jurisdiction in which the adaptive communication hardware 104 of the system 100 is located) to the adaptive communication hardware 104 based on location data representative of the location of communication hardware of the system 100, in accordance with the techniques disclosed herein. The functionality of the location provider 102 may be provided at least in part by hardware programmed with appropriate software. In some embodiments, as discussed below, the location provider 102 and the adaptive communication hardware 104 may be included in a common wireless device (e.g., in a passive operation or other legal operational mode).

The adaptive communication hardware 104 may include any suitable hardware configured to adapt its operation in response to receiving a jurisdiction identifier from the location provider 102, in accordance with the techniques disclosed herein. The functionality of the adaptive communication hardware 104 may be provided at least in part by hardware programmed with appropriate software. In some embodiments, the adaptive communication hardware 104 may not include a cellular modem and/or may not be connected to a cellular network when using the systems and techniques disclosed herein. Although only a single location provider 102 is illustrated in FIG. 1, multiple location providers configured as discussed herein with reference to the location provider 102 may be in communication with the adaptive communication hardware 104. These different location providers may represent different sources of jurisdiction identifiers for the adaptive communication hardware 104.

In some embodiments, the system 100 may be included in a single computing device. For example, the system 100 may be included in a single wireless device, and the adaptive communication hardware 104 may include network interface hardware and other suitable components for providing adaptive wireless communication functionality to the wireless device. A number of examples of apparatus that may implement the system 100 are discussed below with reference to the apparatus 1300 of FIG. 13.

The location provider 102 may provide jurisdiction identifiers based on location data arising from any of a number of sources. For example, the location data may include global geolocation coordinates, and one source of such location data may be a global navigation satellite system (e.g., a global positioning system or GPS device), a receiver for which may be included in the location provider 102 or in communication with the location provider 102. A GPS receiver may be configured to receive messages from satellites that allow the GPS receiver to generate location data for a device monitored by GPS, in accordance with known techniques. The location data may include latitude, longitude, and altitude, for example. Another source of location data may be a Wi-Fi device configured to generate location data based on the received signal strengths from identified Wi-Fi beacons (e.g., identified via Service Set Identifiers and/or Media Access Control data) having known positions, in accordance with known techniques. Another source of location data may be a cellular location device configured to generate location data based on multilateration of cellular communication network signals from different radio towers, in accordance with known techniques. These sources are simply illustrative, and any suitable source may be used.

Figure 2:
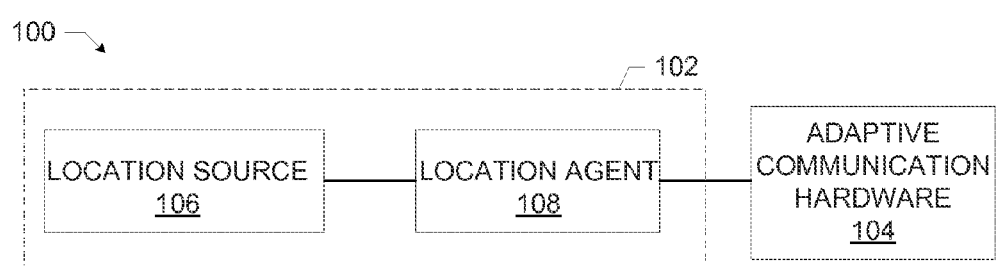
FIG. 2 is a block diagram of an example embodiment of the adaptive communication system of FIG. 1.

In some embodiments, the various components of the system 100 may be distributed between two or more computing devices. For example, FIG. 2 is a block diagram of an example embodiment of the adaptive communication system 100 of FIG. 1 in which the location provider 102 may include a location source 106 and a location agent 108. Each of the location source 106 and the location agent 108 may include suitable computing hardware configured in accordance with the techniques described herein. A number of examples of apparatus that may implement location provider 102 and/or the location agent 108 are discussed below with reference to the apparatus 1300 of FIG. 13. The location source 106 may be configured to provide location data, nominally representative of a location at which communication hardware of the system 100 is located, to the location agent 108. The location agent 108 may be configured to receive the location data from the location source 106, and provide a jurisdiction identifier (nominally representative of a jurisdiction at which communication hardware of the system 100 is located) to the adaptive communication hardware 104. Although only a single location source 106 is illustrated in FIG. 2, multiple location sources 106 may be in communication with the location agent 108. Additionally, although only a single location agent 108 is illustrated in FIG. 2, multiple location agents 108 may be in communication with the adaptive communication hardware 104. These different location agents 108 may represent different sources of jurisdiction identifiers for the adaptive communication hardware 104. In some embodiments, each of the different location agents 108 may be associated with one or more different location sources 106. For example, one location agent 108 may be associated with a global navigation satellite system location source 106 (e.g., a global positioning system (GPS) device), and a second location agent 108 may be associated with a wireless access point location source 106. Other examples of location sources 106 may include a Wi-Fi-based location device, a cellular network-based location device, an image capture device for capturing images of the environment of the adaptive communication hardware 104 (coupled with an image processor to identify a location based on landmarks or other markers captured in images), an accelerometer, an altimeter, or any other such device.

In some embodiments, the location agent 108 and the adaptive communication hardware 104 may be included in a single computing device. For example, the location agent 108 in the adaptive communication hardware 104 may be included in a single wireless device. In some such embodiments, the location source 106 may be remote from the single wireless device that includes location agent 108 and the adaptive communication hardware 104. In some such embodiments, multiple location sources configured as discussed herein with reference to the location source 106 may be remote from and in communication with the location agent 108.

Figure 3:
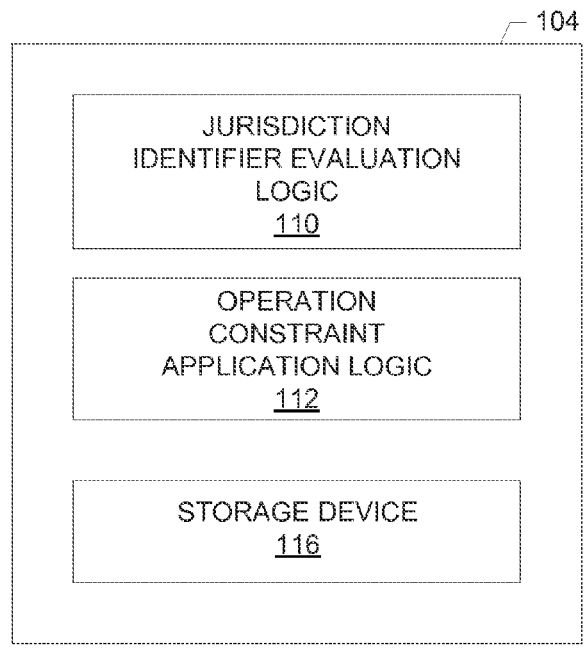
FIG. 3 is a block diagram of communication hardware that may be included in an adaptive communication system, in accordance with various embodiments.

FIG. 3 is a block diagram of the adaptive communication hardware 104 that may be included in the adaptive communication system 100, in accordance with various embodiments. In some embodiments, the adaptive communication hardware 104 may be configured to store different jurisdiction identifiers, each jurisdiction identifier in association with a stored set of wireless communication operation constraints, and to store an identifier of a trusted location provider. In some such embodiments, the adaptive communication hardware 104 may be configured to receive a jurisdiction identifier nominally representative of a jurisdiction in which the adaptive communication hardware 104 is located, and may be configured to validate or invalidate the received jurisdiction identifier based on whether the received jurisdiction identifier corresponds to one of the stored jurisdiction identifiers and was provided by the trusted location provider. If the received jurisdiction identifier is validated, the adaptive communication hardware 104 may be configured to apply the stored set of wireless communication operation constraints corresponding to the received jurisdiction identifier to adapt the operation of the adaptive communication hardware 104.

The adaptive communication hardware 104 may include a storage device 116. The storage device 116 may be configured to store a first memory structure to hold one or more identifiers of a corresponding one or more jurisdictions. An identifier of a jurisdiction may take any suitable form. For example, a jurisdiction may be identified by its name (e.g., "China," "European Union, "Smithfield Military Base," etc.). A jurisdiction may be identified by an abbreviation (e.g., "USA" for the United States of America, "FRA" for France, etc.). A jurisdiction may be identified by a number, or any other sequence of symbols that is recognized by both the adaptive communication hardware 104 and the device providing jurisdiction identifiers to the adaptive communication hardware 104 (e.g., the location provider 102, as discussed below with reference to the jurisdiction identifier evaluation logic 110). In some embodiments, multiple "jurisdictions" (e.g., multiple countries) may be grouped under a single common jurisdiction identifier when the wireless communication operation constraints imposed by those jurisdictions are the same or similar. In such a case, the jurisdiction identifier may represent a "virtual jurisdiction" formed of multiple political, geographic or other jurisdictions.

The first memory structure may also be configured to hold one or more sets of wireless communication operation constraints, as well as associations between individual ones of the jurisdiction identifiers and respective individual ones of the sets of wireless communication operation constraints. Associations between data in a memory structure may be implemented based on the memory structure, and may include, for example, pointers, references in a look-up table, sharing a common row or entry, or any other known technique for associating data in a memory structure.

As noted above, a set of wireless communication operation constraints may be representative of legal, regulatory, technical, industry-determined, or other constraints that govern the operation of wireless devices within the jurisdiction identified by the jurisdiction identifier associated with the set of wireless communication operation constraints. Any constraints relevant to the operation of a wireless communication device in a particular jurisdiction may be included in the stored set of wireless communication operation constraints associated with an identifier of that jurisdiction. For example, in some embodiments, a set of wireless communication operation constraints may include an allowed channel of operation, a prohibited channel of operation, a maximal allowed transmit power (e.g., per channel), and/or an allowed spectral mask. These example constraints may further include other constraints or specifications; for example, in some embodiments, different modulation and coding schemes (MCS) used for wireless communication may have different transmit power constraints for the same channel. Other examples of wireless communication operation constraints may require the detection and avoidance of interference with specific "incumbent" services in various channels and bands, such as weather radar equipment and intelligent transportation systems. Wireless communication operation constraints stored in the storage device 116 may be relevant to different types of wireless communications. For example, in some embodiments, at least one of the plurality of sets of wireless communication operation constraints affects Wi-Fi communication operations of the adaptive communication hardware 104. In some embodiments, at least one of the plurality of sets of wireless communication operation constraints affects short-range wireless communication operations of the adaptive communication hardware 104 (e.g., Bluetooth, Zigbee, or other short-range protocols). In some embodiments, at least one of the plurality of sets of wireless communication operation constraints affects wide area network (WAN) communication operations of the adaptive communication hardware 104 (e.g., cellular protocols, such as 3G protocols).

In some embodiments, each of the jurisdiction identifiers may be associated with a different set of wireless communication operation constraints. In other embodiments, two or more jurisdiction identifiers may be associated with a common set of wireless communication operations constraints. This may occur when, for example, two or more countries have enacted the same regulations governing the use of wireless devices within their borders; in such a scenario, the storage device 116 may store a set of wireless communication operation constraints corresponding to these regulations, and may associate jurisdiction identifiers for each of the two or more countries with this set of wireless communication operation constraints.

In embodiments in which a set of wireless communication operation constraints includes constraints on two or more different aspects of wireless communication, certain jurisdictions may share regulations governing one aspect while differing on regulations governing a different aspect. In such embodiments, a single copy of those aspects that are common between the jurisdictions may be stored in the storage device 116, and associated with jurisdiction identifiers of the relevant jurisdictions. For example, if Country A and Country B share a prohibited channel of operation, but have different maximal allowed transmit powers, the storage device 116 may include a single copy of the prohibited channel of operation constraint that is associated with an identifier of Country A and an identifier of Country B, and may include different maximal allowed transmit power constraints associated with the identifier of Country A and the identifier of Country B.

Any suitable memory structure may be used to hold jurisdiction identifiers in association with sets of wireless communication operation constraints. For example, FIG. 5 depicts a memory structure 500 that may hold jurisdiction identifiers and associated sets of wireless communication operation constraints, in accordance with various embodiments. The memory structure 500 may include a jurisdiction identifier field 502, a wireless communication operation constraints field 504, and multiple entries 506-512, each including a jurisdiction identifier and an associated set of wireless communication operation constraints in their respective fields. The sets of wireless communication operation constraints shown in FIG. 5 are simply illustrative, and not representative of any particular constraints actually imposed by any particular jurisdiction. Although a single wireless communication operation constraints field 504 is illustrated in the memory structure 500, the memory structure 500 may include different fields for different aspects of wireless communication. For example, the memory structure 500 may include one field for prohibited channels, and a different field for allowed channels. If a particular jurisdiction does not have any constraints governing one or more aspects, the entry for that aspect and that jurisdiction may leave the corresponding aspect field blank, or may include a placeholder indicating that no constraint is present.

In some embodiments, the storage device 116 may be configured to store a memory structure that may hold an "invalid" jurisdiction identifier. The invalid jurisdiction identifier may be provided to the adaptive communication hardware 104 by the location provider 102 when the location provider 102 is unable to determine the jurisdiction in which the adaptive communication hardware 104 is located. This may occur when the location provider 102 (e.g., the location agent 108) has not received location data from a trusted location source 106, the received location data is not sufficiently accurate, the received location data is not sufficiently current (in that the location data has a timestamp representing a time that falls outside of a predetermined window with respect to the current time), the received location data is corrupted, or another error in operation has occurred.

The invalid jurisdiction identifier may be associated with a default set of wireless communication operation constraints. The default set of wireless communication operation constraints may describe the wireless communication operation constraints that the adaptive communication hardware 104 is to follow if the invalid jurisdiction identifier is received or the adaptive communication hardware 104 is otherwise unable to determine its jurisdiction. In some embodiments, the default set of wireless communication operation constraints may satisfy all of the other sets of wireless communication operation constraints stored in the storage device 116. In other words, the default set of wireless communication operation constraints may be such that, when the adaptive communication hardware 104 operates in accordance with the default set of wireless communication operation constraints, the adaptive communication hardware 104 will satisfy the wireless communication operation constraints of any of the jurisdictions whose identifiers are stored in the storage device 116. In some embodiments, the default set of wireless communication operation constraints may provide a "worldwide common" set of operation constraints.

The invalid jurisdiction identifier and associated default set of wireless communication operation constraints may be stored in the same memory structure as the other jurisdiction identifiers and sets of wireless communication operation constraints (e.g., the memory structure 500 discussed above with reference to FIG. 5) or in a different memory structure. For example, FIG. 6 depicts a memory structure 600 that may hold an invalid jurisdiction identifier and an associated set of default wireless communication operation constraints, in accordance with various embodiments. The memory structure 600 may include a jurisdiction identifier field 602, a wireless communication operation constraints field 604, and an entry 606 including the invalid jurisdiction identifier and the associated default set of wireless communication operation constraints in their respective fields. Although a single invalid jurisdiction identifier entry is illustrated in FIG. 6, the adaptive communication hardware 104 may recognize multiple different invalid jurisdiction identifiers, which may be associated with different or a common set of default wireless communication operation constraints. In some embodiments, the location provider 102 may provide different invalid jurisdiction identifiers corresponding to different reasons that the location provider 102 was unable to provide an invalid jurisdiction identifier. For example, the location provider 102 may provide a first invalid jurisdiction identifier when received location data is not sufficiently accurate and a second invalid jurisdiction identifier when received location data is not sufficiently current. The adaptive communication hardware 104 may use these different invalid jurisdiction identifiers to log the performance of the location provider 102, to communicate with the location provider 102 about its performance, or for any other desired purpose. In some embodiments, the adaptive communication hardware 104 may use an invalid jurisdiction identifier when it does not recognize a jurisdiction identifier provided by the location provider 102 (e.g., the jurisdiction identifier provided by the location provider 102 does not match any of the stored and valid jurisdiction identifiers accessible to the adaptive communication hardware 104). In some embodiments, the adaptive communication hardware 104 may be initialized so as to use the invalid jurisdiction identifier as a default setting unless a recognized alternative jurisdiction identifier is provided by the location provider 102.

The storage device 116 may also be configured to store a second memory structure to hold identifiers of one or more trusted location providers. A trusted location provider may be a location provider that has been previously determined to be trustworthy by a developer of the adaptive communication hardware 104 or another entity so that jurisdiction identifiers provided by a trusted location provider (representative of a jurisdiction in which the adaptive communication hardware 104 is located) should be used by the adaptive communication hardware 104 to adapt its operation to conform to constraints within that jurisdiction. In some embodiments, a trusted location provider may provide jurisdiction identifiers that are encrypted or signed with a key known to the adaptive communication hardware 104 so that the provider of received jurisdiction identifiers can be authenticated using that key or an associated key.

As discussed above with reference to the location provider 102, a location provider may be local to the adaptive communication hardware 104 (e.g., included in a same wireless device at the adaptive communication hardware 104), may be remote from the adaptive communication hardware 104, or may include components that are both local to and remote from the adaptive communication hardware 104 (e.g., as discussed above with reference to the embodiment of FIG. 2 in which the location agent 108 is local to the adaptive communication hardware 104 and the location source 106 is remote from the adaptive communication hardware 104). In some embodiments, the storage device 116 may store a trusted location provider identifier that identifies a service of an operating system of a wireless device that includes the adaptive communication hardware 104. As used herein, a "service of an operating system" may include a set of Application Programming Interfaces (APIs) and related capabilities provided by an operating system that can be used by applications and/or devices operating within the context of the operating system. In some embodiments, the storage device 116 may store a trusted location provider identifier that identifies a system service of a wireless device that includes the adaptive communication hardware 104. As used herein, a "system service" provided by a wireless device may include any suitable capability of the wireless device exported through a well-defined API, often through an operating system. In some embodiments, the storage device 116 may store a trusted location provider identifier that identifies a global navigation satellite system device. In some embodiments, the storage device 116 may store a trusted location provider identifier that identifies an access point or other beacon. In some embodiments, the storage device 116 may store a trusted location provider identifier that identifies a trusted independent hardware vendor (IHV) location provider. In some embodiments, the storage device 116 may store a trusted location provider identifier that identifies a trusted operating system (OS) location provider. The computing device that includes the adaptive communication hardware 104 may include hardware suitable for receiving jurisdiction identifiers from the one or more trusted location providers whose identifiers are stored in the storage device 116 (e.g., a global positioning system receiver).

Any suitable memory structure may be used to hold trusted location provider identifiers. For example, FIG. 7 depicts a memory structure 700 that may hold trusted location provider identifiers, in accordance with various embodiments. The memory structure 700 may include a trusted location provider identifier field 702, a key field 704, and multiple entries 706 and 708, each including a trusted location provider identifier and key in their respective fields. The key field 704 may include a decryption key that may be used to decrypt and/or verify a jurisdiction identifier provided by the trusted location provider associated with the decryption key to authenticate that the jurisdiction identifier is indeed from the associated trusted location provider. In some embodiments, a key stored in the key field 704 may be a public key of a public-private key pair, and may be used to authenticate a jurisdiction identifier signed by the associated trusted location provider with the associated private key. In particular, a trusted location provider may store the associated private key and may include authentication logic configured to use the associated private key to encrypt and/or sign the jurisdiction identifier, and the public key stored in the key field 704 may be used to decrypt and/or verify the encrypted or signed jurisdiction identifier. In some embodiments, no key field 704 may be included.

The adaptive communication hardware 104 may include jurisdiction identifier evaluation logic 110. The jurisdiction identifier evaluation logic 110 may be coupled to the storage device 116, and may be in communication with the location provider 102 (e.g., the location agent 108). The jurisdiction identifier evaluation logic 110 may be configured to validate or invalidate a jurisdiction identifier received by the adaptive communication hardware 104. The received jurisdiction identifier may be provided by the location provider 102 (e.g., by the location agent 108 based on location data provided by the location source 106). A jurisdiction identifier may be received by the adaptive communication hardware 104 at periodic intervals (e.g., pushed by the location provider 102) or may be received by the adaptive communication hardware 104 in response to a request transmitted from the adaptive communication hardware 104 to the location provider 102 (e.g., pulled from the location provider 102). The request may be transmitted at predetermined intervals, in response to detecting that the adaptive communication hardware 104 has traveled a predetermined distance (e.g., using an accelerometer), or according to any other schedule or set of trigger conditions. For example, a push or pull of a jurisdiction identifier may be triggered in response to the occurrence of a predefined event and/or periodically. In some embodiments, a periodic request for a jurisdiction identifier may be transmitted to the location provider 102 by a system service or daemon of the adaptive communication hardware 104.

The jurisdiction identifier evaluation logic 110 may be configured to validate or invalidate the received jurisdiction identifier in any of a number of ways. For example, in some embodiments, the jurisdiction identifier evaluation logic 110 may compare the received jurisdiction identifier to the jurisdiction identifiers stored in the first memory structure of the storage device 116. If the jurisdiction identifier evaluation logic 110 determines that the received jurisdiction identifier does not correspond to one of the already-stored jurisdiction identifiers, the jurisdiction identifier evaluation logic 110 may invalidate the received jurisdiction identifier; otherwise, the jurisdiction identifier evaluation logic 110 may validate the received jurisdiction identifier or proceed to perform another validation operation.

In some embodiments, the jurisdiction identifier evaluation logic 110 may compare the received jurisdiction identifier to the jurisdiction identifiers stored in the storage device 116 to determine whether the received jurisdiction identifier corresponds to an invalid jurisdiction identifier stored in the storage device 116 (e.g., as discussed above with reference to the memory structures 500 and 600 of FIGS. 5 and 6). If the jurisdiction identifier evaluation logic 110 determines that the received jurisdiction identifier corresponds to a stored invalid jurisdiction identifier, the jurisdiction identifier evaluation logic 110 may invalidate the received jurisdiction identifier; otherwise, the jurisdiction identifier evaluation logic 110 may validate the received jurisdiction identifier or proceed to perform another validation operation.

In some embodiments, the jurisdiction identifier evaluation logic 110 may compare an identifier of the location provider that provided the received jurisdiction identifier to the trusted location provider identifiers stored in the second memory structure of the storage device 116. If the jurisdiction identifier evaluation logic 110 determines that the location provider that provided the received jurisdiction identifier is not one of the trusted location providers, the jurisdiction identifier evaluation logic 110 may invalidate the received jurisdiction identifier; otherwise, the jurisdiction identifier evaluation logic 110 may validate the received jurisdiction identifier or proceed to perform another validation operation.

In some embodiments, the jurisdiction identifier evaluation logic 110 may determine whether the received jurisdiction identifier can be authenticated as being provided by the trusted location provider that nominally provided the received jurisdiction identifier. For example, the jurisdiction identifier evaluation logic 110 may use a key associated with the trusted location provider (e.g., stored in the storage device 116 as discussed above with reference to the memory structure 700 of FIG. 7) to attempt to authenticate the received jurisdiction identifier (e.g., by decrypting or verifying the received jurisdiction identifier). If the jurisdiction identifier evaluation logic 110 is not able to successfully authenticate the received jurisdiction identifier (e.g., by failing to decrypt and/or verify the received jurisdiction identifier), the jurisdiction identifier evaluation logic 110 may invalidate the received jurisdiction identifier; otherwise, the jurisdiction identifier evaluation logic 110 may validate the received jurisdiction identifier or proceed to perform another validation operation.

The adaptive communication hardware 104 may include operation constraint application logic 112. The operation constraint application logic 112 may be coupled to the storage device 116, and may be in communication with the jurisdiction identifier evaluation logic 110. The operation constraint application logic 112 may be configured to, in response to validation of a received jurisdiction identifier by the jurisdiction identifier evaluation logic 110 (as discussed above), apply a stored set of wireless communication operation constraints corresponding to the received jurisdiction identifier (and the associated stored jurisdiction identifier) to adapt the operation of the adaptive communication hardware 104. In particular, the operation constraint application logic 112 may cause the adaptive communication hardware 104 to operate within the constraints imposed by the set of wireless communication operation constraints associated with the received jurisdiction identifier, thereby adapting operation of the adaptive communication hardware 104 to the regulations of the jurisdiction in which the adaptive communication hardware 104 is operating.

In some embodiments, the operation constraint application logic 112 may be configured to, in response to invalidation of the received jurisdiction identifier by the jurisdiction identifier evaluation logic 110 (as discussed above), apply a stored default set of wireless communication operation constraints to adapt the operation of the adaptive communication hardware 104. Default sets of wireless communication operation constraints are discussed above with reference to FIGS. 5 and 6. For example, the default set of wireless communication operation constraints may satisfy all of the other sets of wireless communication operation constraints stored in the storage device 116, and thereby may be appropriate for all associated jurisdictions.

Figure 4:
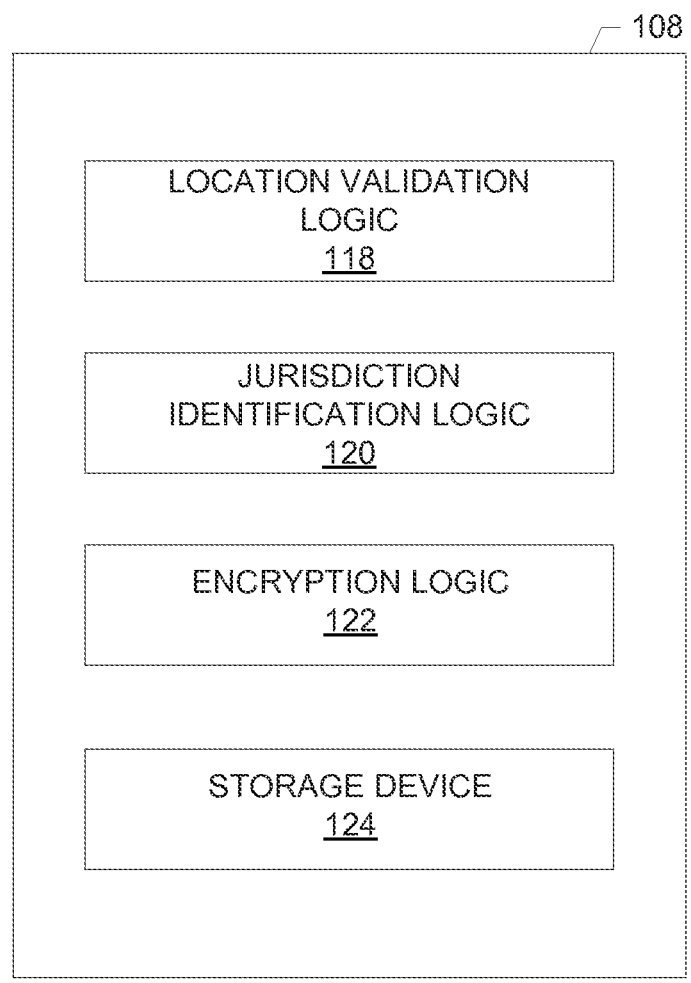
FIG. 4 is a block diagram of a location agent that may be included in an adaptive communication system, in accordance with various embodiments.

FIG. 4 is a block diagram of a location agent 108 that may be included in the adaptive communication system 100, in accordance with various embodiments. As noted above, the location agent 108 may be included in the location provider 102. In some embodiments, the location agent 108 and the adaptive communication hardware 104 may be included in a common wireless device. In some embodiments, the location agent 108 may be configured to store different jurisdiction identifiers, each jurisdiction identifier in association with a stored location-based jurisdiction definition, and to store an identifier of a trusted location source. In some such embodiments, the location agent 108 may receive location data nominally representative of a location at which adaptive communication hardware 104 of a particular wireless device is located (e.g., a wireless device that includes both the location agent 108 and the adaptive communication hardware 104), and may validate or invalidate the received location data based on whether the received location data was provided by the trusted location source. If the received location data is validated, the location agent 108 may identify a jurisdiction identifier corresponding to the received location data (based on the stored location-based jurisdiction definitions), and may cause the provision of the jurisdiction identifier to the adaptive communication hardware 104 of the particular wireless device for use by the adaptive communication hardware 104 to adapt its operation.

The location agent 108 may include a storage device 124. The storage device 124 may be configured to store a first memory structure to hold one or more identifiers of a corresponding one or more jurisdictions. The jurisdiction identifiers held in the first memory structure may take any suitable form, such as any of the forms of jurisdiction identifiers discussed above with reference to the storage device 116 of the adaptive communication hardware 104. In particular, the jurisdiction identifiers may take any form agreed upon by both the location agent 108 and the adaptive communication hardware 104. In some embodiments, for example, the jurisdiction identifiers held in the first memory structure of the storage device 124 may correspond to various countries.

The first memory structure may also be configured to hold one or more location-based jurisdiction definitions, as well as associations between individual ones of the jurisdiction identifiers and respective individual ones of the location-based jurisdiction definitions. A location-based jurisdiction definition may take any suitable form such that, when the location agent 108 receives location data representative of the location of the adaptive communication hardware 104 from a trusted location source, the location agent 108 is able to determine into which jurisdiction (identified by an associated jurisdiction identifier in the first memory structure) the location falls (or to determine that the location does not fall into any predefined jurisdiction). In some embodiments, a location-based jurisdiction definition may take the form of any of the formats used to describe a geofence in a geofencing application, as known in the art. For example, a location-based jurisdiction definition may be an area bounded by a circular boundary defined in the first memory structure by a center location and a radius. A location-based jurisdiction definition may be an area bounded by an irregular boundary defined in the first memory structure by a number of points (e.g., longitude and latitude) along the boundary and an interpolation rule for interpolating between the points (e.g., interpolation via a straight line or a curve). A location-based jurisdiction definition may be an area bounded by a polygon boundary defined in the first memory structure by a number of boundary corners connected by boundary segments (which may be expressly included in the first memory structure or implied by an interpolation rule included in the first memory structure or elsewhere). Any other suitable location-based jurisdiction definition may be used.

In some embodiments, identification of a jurisdiction based on location data may be a two step process; in the first step, the location data may be translated to a particular jurisdiction (e.g., identifying that a particular set of GPS coordinates is located in Paris, France) and in the second step, the jurisdiction may be translated to a particular jurisdiction identifier (e.g., determining that Paris, France corresponds to the jurisdiction identifier EU). This may be particularly useful when multiple disparate geographic jurisdictions are associated with one jurisdiction identifier (e.g., the jurisdiction identifier ANZ, representing the jurisdictions Australia and New Zealand).

Any suitable memory structure may be used to hold jurisdiction identifiers in association with location-based jurisdiction definitions. For example, FIG. 8 depicts a memory structure 800 that may hold jurisdiction identifiers and associated location-based jurisdiction definitions, in accordance with various embodiments. The memory structure 800 may include a jurisdiction identifier field 802, a location-based jurisdiction definitions field 804, and multiple entries 806-812, each including a jurisdiction identifier and an associated location-based jurisdiction definition in their respective fields. The location-based jurisdiction definitions shown in FIG. 8 are simply illustrative, and not representative of any particular definition of any particular jurisdiction.

The storage device 124 may also be configured to store a second memory structure to hold identifiers of one or more trusted location sources. A trusted location source may be a location source that has been previously determined to be trustworthy by a developer of the adaptive communication hardware 104, the location agent 108, or another entity so that the location data provided by a trusted location source (representative of a location of the adaptive communication hardware 104) should be used by the location agent 108 to determine a jurisdiction in which the adaptive communication hardware 104 falls in order to cause the adaptive communication hardware 104 to adapt its operation to conform to constraints within that jurisdiction. In some embodiments, a trusted location source 106 may provide location data that are encrypted or signed with a key known to the location agent 108 so that the source of received location data can be authenticated using that key or an associated key.

Any suitable memory structure may be used to hold trusted location source identifiers. For example, FIG. 9 depicts a memory structure 900 that may hold trusted location source identifiers, in accordance with various embodiments. The memory structure 900 may include a trusted location source identifier field 902, a key field 904, and multiple entries 906 and 908, each including a trusted location source identifier and key in their respective fields. The key field 904 may include a decryption key that may be used to decrypt and/or verify location data provided by the trusted location source associated with the decryption key to authenticate that the location data is indeed from the associated trusted location source. In some embodiments, a key stored in the key field 904 may be a public key of a public-private key pair, and may be used to authenticate location data signed by the associated trusted location source with the associated private key, as discussed above with reference to FIG. 7. In some embodiments, no key field 904 may be included.

As noted above, in some embodiments, the location provider 102 may be implemented as a separate location source 106 and a location agent 108. In some such embodiments, the examples of trusted location provider identifiers (and related processes) discussed above with reference to FIG. 7 may be implemented as trusted location source identifiers (and related processes) that are to be validated or invalidated by the location agent 108. For example, the storage device 124 may store a trusted location source identifier that identifies a service of an operating system of a wireless device that includes the adaptive communication hardware 104. In some embodiments, the storage device 124 may store a trusted location source identifier that identifies a system service of a wireless device that includes the adaptive communication hardware 104. In some embodiments, the storage device 124 may store a trusted location source identifier that identifies a global navigation satellite system device. In some embodiments, the storage device 124 may store a trusted location source identifier that identifies an access point or other beacon. The computing device that includes the location agent 108 may include hardware suitable for receiving location data from the one or more trusted location sources whose identifiers are stored in the storage device 124 (e.g., a GPS receiver).

The location agent 108 may include location validation logic 118. The location validation logic 118 may be coupled to the storage device 124, and may be in communication with the location source 106. The location validation logic 118 may be configured to validate or invalidate location data received by the location agent 108. Validating the received location data may include verifying that the received location data was provided by a location source that corresponds to a trusted location source identifier stored in the second memory structure of the storage device 124. The received location data may be provided by the location source 106. Location data may be received by the location agent 108 at periodic intervals (e.g., pushed by the location source 106) or may be received by the location agent 108 in response to a request transmitted from the location agent 108 to the location source 106 (e.g., pulled from the location source 106). The request may be transmitted at predetermined intervals, in response to detecting that the adaptive communication hardware 104 has traveled a predetermined distance (e.g., using an accelerometer), or according to any other schedule or set of trigger conditions. In some embodiments, a periodic request for location data may be transmitted to the location source 106 by a system service or daemon of the location agent 108.

The location validation logic 118 may be configured to validate or invalidate the received location data in any of a number of ways. For example, in some embodiments, the location validation logic 118 may compare the received location data to the location-based jurisdiction definitions stored in the first memory structure of the storage device 124. If the location validation logic 118 determines that the received location data does not correspond to one of the already-stored location-based jurisdiction definitions, the location validation logic 118 may invalidate the received location data; otherwise, the location validation logic 118 may validate the received location data or proceed to perform another validation operation.

In some embodiments, the location validation logic 118 may compare an identifier of the location source that provided the received location validation logic 118 (e.g., a location source 106) to the trusted location source identifiers stored in the second memory structure of the storage device 124. If the location validation logic 118 determines that the location source that provided the received location data is not one of the trusted location sources, the location validation logic 118 may invalidate the received location data; otherwise, the location validation logic 118 may validate the received location data or proceed to perform another validation operation.

In some embodiments, the location validation logic 118 may determine whether the received location data can be authenticated as being provided by the trusted location source that nominally provided the received location data. For example, the location validation logic 118 may use a key associated with the trusted location source (e.g., stored in the storage device 124 as discussed above with reference to the memory structure 900 of FIG. 9) to attempt to authenticate the received location data (e.g., by decrypting or verifying the received location data). If the location validation logic 118 is not able to successfully authenticate the received location data (e.g., by failing to decrypt and/or verify the received location data), the location validation logic 118 may invalidate the received location data; otherwise, the location validation logic 118 may validate the received location data or proceed to perform another validation operation.

In some embodiments, the received location data may be time stamped with a time representative of a time at which the nominal measurement of the location of the adaptive communication hardware 104 was made. In some embodiments, the location validation logic 118 may be configured to determine whether the timestamp of the received location data falls within a predetermined time window of a current time. In other words, the location validation logic 118 may be configured to determine whether the received location data is sufficiently "current." The duration of the time window may be stored in the storage device 124 for access by location validation logic 118, and the location agent 108 may include or have access to a clock to determine the current time. If the location validation logic 118 is not able to determine that the timestamp of the received location data falls within the predetermined time window of the current time (e.g., by determining that the timestamp represents a time that is too "old"), the location validation logic 118 may invalidate the received location data; otherwise, the location validation logic 118 may validate the received location data or proceed to perform another validation operation.

In some embodiments, the received location data may include a location accuracy indicating the accuracy of the nominal measurement of the location of the adaptive communication hardware 104. This accuracy may be measured in meters, kilometers, or any other suitable unit, and may be a function of the type of device making the location measurement (e.g., GPS, Wi-Fi localization, or other techniques), the conditions under which the measurement was made, and other known variables. In some embodiments, the location validation logic 118 may be configured to determine whether the location accuracy of the received location data is within a predetermined range. In other words, the location validation logic 118 may be configured to determine whether the received location data is sufficiently "accurate." The predetermined range may be stored in the storage device 124 for access by the location validation logic 118. If the location validation logic 118 is not able to determine that the location accuracy is within the predetermined range (e.g., by determining that the location accuracy falls outside the predetermined range), the location validation logic 118 may invalidate the received location data; otherwise, the location validation logic 118 may validate the received location data or proceed to perform another validation operation.

The location agent 108 may include jurisdiction identification logic 120. The jurisdiction identification logic 120 may be coupled to the storage device 124 and the location validation logic 118. The jurisdiction identification logic 120 may be configured to identify, in response to validation of the received location data by the location validation logic 118, a jurisdiction identifier corresponding to a location-based jurisdiction definition that includes the received location data. For example, jurisdiction identification logic 120 may be configured to analyze the received location data, determine whether the received location data corresponds to any of the stored location-based jurisdiction definitions, and identify the jurisdiction identifier associated with the corresponding stored location-based jurisdiction definition when a "match" occurs.

The jurisdiction identification logic 120 may also be configured to cause the provision of the identified jurisdiction identifier to the adaptive communication hardware 104 for use by the adaptive communication hardware 104 to adapt its operation, as discussed above. The jurisdiction identification logic 120 may cause the provision of the jurisdiction identifier to the adaptive communication hardware 104 in any of a number of ways, such as through a wireless communication pathway or a wired communication pathway. In embodiments in which the location agent 108 and the adaptive communication hardware 104 are included in a common wireless device, the jurisdiction identification logic 120 may cause the provision of the jurisdiction identifier to the adaptive communication hardware 104 over one or more wired communication pathways through circuit boards included in the wireless device.

In some embodiments, the jurisdiction identification logic 120 may be configured to, in response to invalidation of the received location data by the location validation logic 118, identify a designated invalid jurisdiction identifier and cause the provision of the invalid jurisdiction identifier to the adaptive communication hardware 104. An invalid jurisdiction identifier may take any suitable form, such as any of the forms of an invalid jurisdiction identifier discussed above.

In some embodiments, the location agent 108 may include encryption logic 122. The encryption logic 122 may be coupled to the storage device 124 and the jurisdiction identification logic 120, and may be configured to encrypt and/or sign a jurisdiction identifier identified by the jurisdiction identification logic 120 prior to provision of the jurisdiction identifier to the adaptive communication hardware 104. In some embodiments, the encryption logic 122 may be called or triggered by the jurisdiction identification logic 120 to perform the encryption or signing on the identified jurisdiction identifier. The encrypted or signed jurisdiction identifier may be provided to the adaptive communication hardware 104, and the adaptive communication hardware 104 may be configured to attempt to decrypt and/or verify the encrypted or signed jurisdiction identifier to authenticate the location agent 108, as discussed above.

Figure 10:
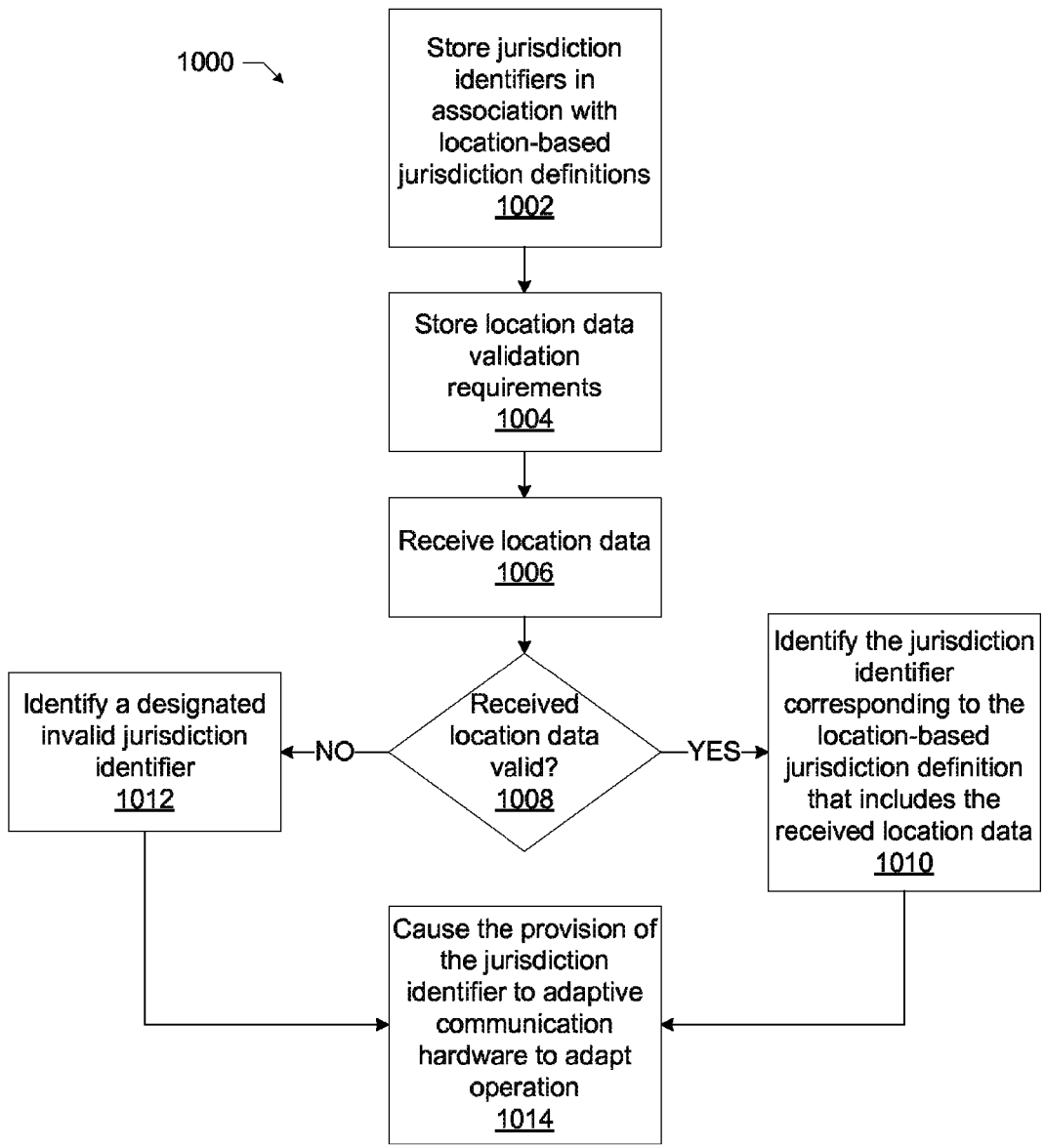
FIG. 10 is a flow diagram of an illustrative process for causing the provision of a jurisdiction identifier to communication hardware, based on received location data, for use by the adaptive communication hardware to adapt its operation, in accordance with various embodiments.
Figure 11:
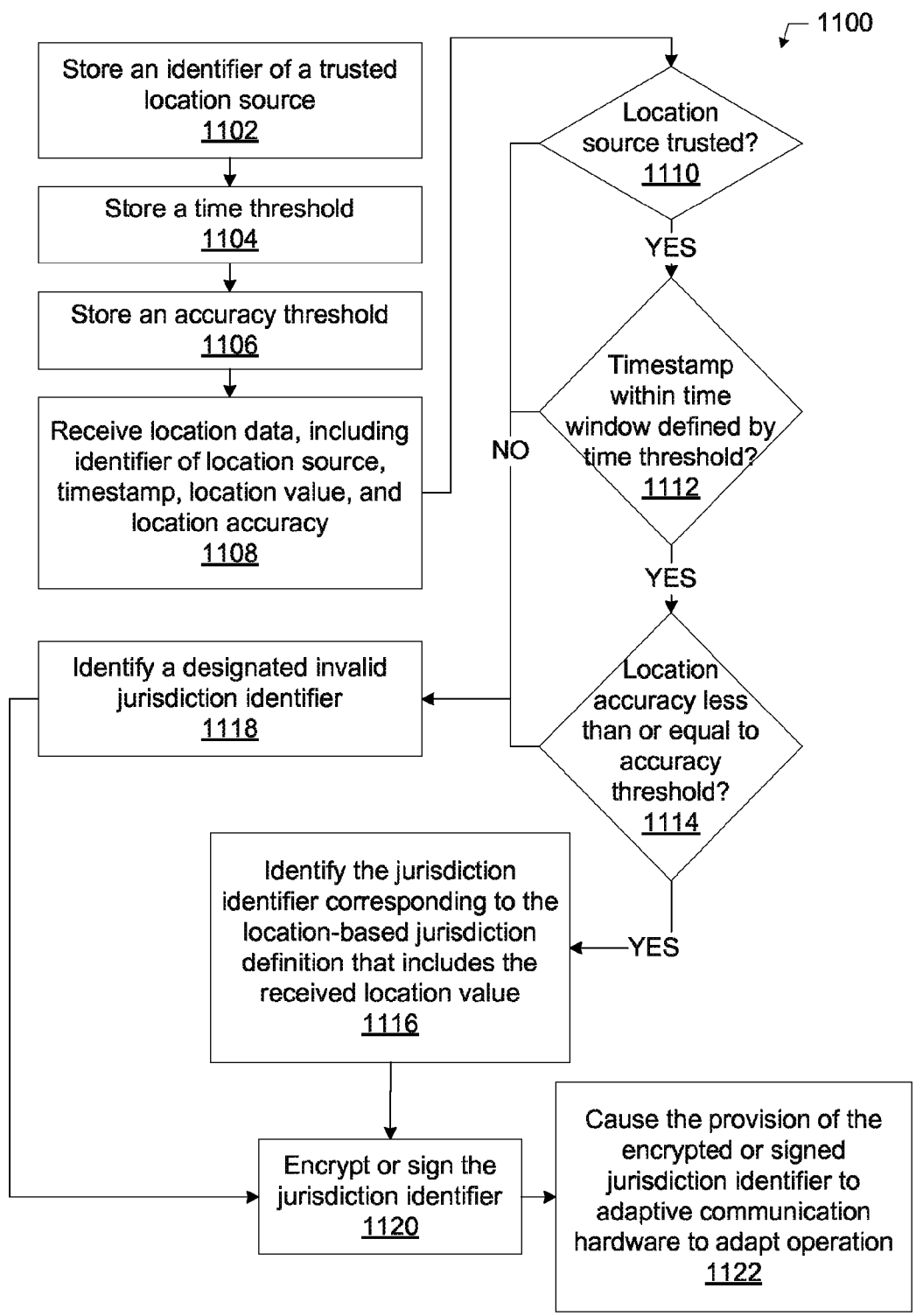
FIG. 11 is a flow diagram of an example embodiment of a process that may be executed as a portion of the illustrative process of FIG. 10.
Figure 12:
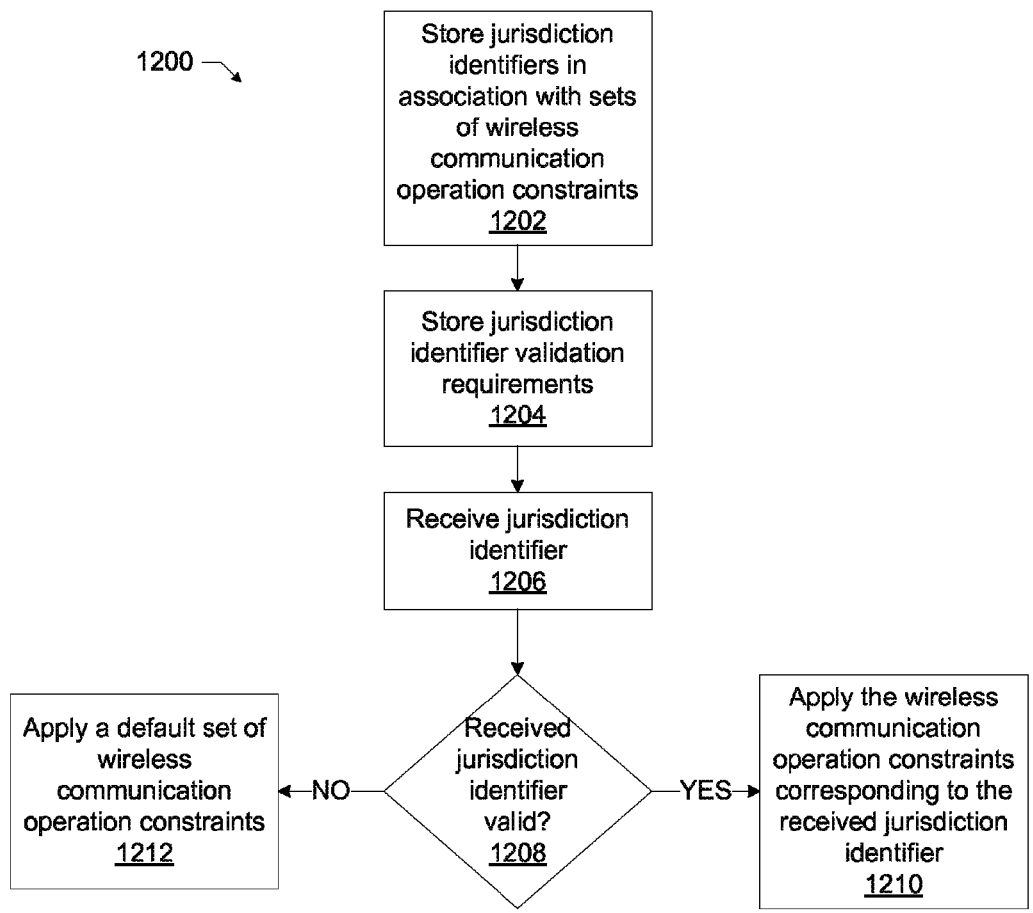
FIG. 12 is a flow diagram of an illustrative process for applying wireless communication constraints, based on a received jurisdiction identifier, to adapt the operation of communication hardware, in accordance with various embodiments.

A number of examples of operations performed by various components of embodiments of an adaptive communication system are discussed herein. FIGS. 10-12 are flow diagrams of some such examples of processes that may be performed by various components of various embodiments of an adaptive communication system. The operations of the processes of FIGS. 10-12 (and the other processes described herein), although illustrated as performed in a particular sequence for the sake of illustration, may be performed in parallel as suitable or in any other order. Operations of the processes of FIGS. 10-12 (and the other processes described herein) may be described as performed by components of the adaptive communication system 100 for illustrative purposes, but the operations of these processes may be performed by any suitably configured computing device or collection of computing devices. Any of the operations of the processes of FIGS. 10-12 (and the other processes described herein) may be performed in accordance with any of the embodiments of the adaptive communication system 100 described herein.

FIG. 10 is a flow diagram of an illustrative process 1000 for causing the provision of a jurisdiction identifier to communication hardware, based on received location data, for use by the adaptive communication hardware to adapt its operation, in accordance with various embodiments. The operations of the process 1000 may be described as performed by various components of the location agent 108, but as noted above, any suitably configured computing device or collection of computing devices may be used to execute the process 1000.

At 1002, the location agent 108 may store (e.g., in the storage device 124) one or more jurisdiction identifiers in association with location-based jurisdiction definitions. The jurisdiction identifiers and associated location-based jurisdiction definitions may be provided to the location agent 108 during manufacture and initial provisioning of the location agent 108 (e.g., the manufacturing and provisioning of a wireless device in which the location agent 108 is included), and/or may be provided to the location agent 108 as "updates" (via a wired or wireless network connection, or on a non-transitory computer-readable media, such as a solid state drive) after manufacture.

At 1004, the location agent 108 may store (e.g., in the storage device 124) location data validation requirements. Examples of location data validation requirements may include identifiers of one or more trusted location sources, a required accuracy of location data, or any of the other location data validation requirements discussed above with reference to the location validation logic 118. The location data validation requirements may be provided to the location agent 108 during manufacture and initial provisioning of the location agent 108, and/or may be provided to the location agent 108 as "updates," as discussed above with reference to 1002.

At 1006, the location agent 108 may receive location data from the location source 106. The location data may be nominally representative of a location of the adaptive communication hardware 104. The location data may be received via a wired or wireless network connection, for example.

At 1008, the location agent 108 (e.g., the location validation logic 118) may determine whether the location data received at 1006 is valid by evaluating the received location data against the location data validation requirements of

1004. Any of the validation operations discussed above with reference to the location validation logic 118 may be performed in any combination at 1008.

If the location agent 108 determines at 1008 that the received location data is valid, the location agent 108 may proceed to 1010, at which the location agent 108 (e.g., the jurisdiction identification logic 120) may identify the jurisdiction identifier corresponding to the location-based jurisdiction definition that includes the received location data. If the location agent 108 determines at 1008 that the received location data is invalid, the location agent 108 may proceed to 1012, at which the location agent 108 (e.g., the jurisdiction identification logic 120) may identify a designated invalid jurisdiction identifier.

At 1014, the location agent 108 (e.g., the jurisdiction identification logic 120) may cause the provision of the jurisdiction identifier (identified at 1010 or 1012) to the adaptive communication hardware 104 for use in adapting the operation of the adaptive communication hardware 104. In some embodiments, the location agent 108 (e.g., the encryption logic 122) may encrypt and/or sign the identified jurisdiction identifier at 1014 and may cause the provision of the encrypted or signed jurisdiction identifier.

FIG. 11 is a flow diagram of an example embodiment of a process 1100 that may be executed as a portion of the illustrative process 1000 of FIG. 10. In particular, the operations of the process 1100 may be executed as 1004-1014 of the process 1000 of FIG. 10.

In the process 1100, the operations described with reference to 1102-1106 may provide the operations described with reference to the storage of location data validation requirements at 1004 of the process 1000. At 1102, the location agent 108 may store (e.g., in the storage device 124) identifiers of one or more trusted location sources. At 1104, the location agent 108 may store (e.g., in the storage device 124) a time threshold. At 1106, the location agent 108 may store (e.g., in the storage device 124) an accuracy threshold.

At 1108, the location agent 108 may receive location data from the location source 106. The location data received at 1108 may include an identifier of the location source, a timestamp, a location value nominally representative of a location of the adaptive communication hardware 104, and a location accuracy.

At 1110, the location agent 108 (e.g., the location validation logic 118) may determine whether the source of the location data (indicated in the location data received at 1108) is a trusted location source. The location agent 108 may perform the determination by comparing an identifier of the source of location data indicated in the location data received at 1108 with the trusted location source identifiers stored at 1102.

If the location agent 108 determines at 1110 that the location source is a trusted location source, the location agent 108 (e.g., the location validation logic 118) may proceed to 1112 and determine whether the timestamp of the received location data is within a time window defined by subtracting the time threshold (stored at 1104) from the current time.

If the location agent 108 determines at 1112 that the timestamp of the received location data is within the time window, the location agent 108 (e.g., the location validation logic 118) may proceed to 1114 and determine whether the location accuracy of the received location data is less than or equal to the accuracy threshold stored at 1106.

If the location agent 108 determines at 1114 that the location accuracy of the received location data is less than or equal to the accuracy threshold, the location agent 108 (e.g., the jurisdiction identification logic 120) may proceed to 1116 to identify the jurisdiction identifier corresponding to location-based jurisdiction definition that includes the received location value (corresponding to 1010 of the process 1000 of FIG. 10). If the received location value does not satisfy any of the stored location-based jurisdiction definitions, the location agent 108 may identify an invalid jurisdiction identifier at 1116.

If the location agent 108 determines at 1110 that the source of the location data is not a trusted location source, or determines at 1112 that the timestamp of the received location data is not within the time window, or determines at 1114 that the location accuracy does not satisfy the accuracy threshold, the location agent 108 (e.g., the jurisdiction identification logic 120) may proceed to 1118 to identify a designated invalid jurisdiction identifier.

At 1120, the location agent 108 (e.g., the encryption logic 122) may encrypt and/or sign the jurisdiction identifier identified at either of 1116 or 1118.

At 1122, the location agent 108 (e.g., the jurisdiction identification logic 120) may cause the provision of the encrypted or signed jurisdiction identifier to the adaptive communication hardware 104 for use by the adaptive communication hardware 104 in adapting its operation.

FIG. 12 is a flow diagram of an illustrative process 1200 for applying wireless communication constraints, based on a received jurisdiction identifier, to adapt the operation of communication hardware, in accordance with various embodiments. The operations of the process 1200 may be described as performed by various components of the adaptive communication hardware 104, but as noted above, any suitably configured computing device or collection of computing devices may be used to execute the process 1200.

At 1202, the adaptive communication hardware 104 may store (e.g., in the storage device 124) one or more jurisdiction identifiers in association with sets of wireless communication operation constraints. The jurisdiction identifiers and associated sets of wireless communication operation constraints may be provided to the adaptive communication hardware 104 during manufacture and initial provisioning of the adaptive communication hardware 104 (e.g., the manufacturing and provisioning of a wireless device in which the adaptive communication hardware 104 is included), and/or may be provided to the adaptive communication hardware 104 as "updates" (via a wired or wireless network connection, or on a non-transitory computer-readable media, such as a solid state drive) after manufacture.

At 1204, the adaptive communication hardware 104 may store (e.g., in the storage device 116) jurisdiction identifier validation requirements. Examples of jurisdiction identifier validation requirements may include identifiers of one or more trusted location providers, a requirement that the jurisdiction identifier corresponds to a stored jurisdiction identifier, or any of the other jurisdiction identifier validation requirements discussed above with reference to the jurisdiction identifier evaluation logic 110. The jurisdiction identifier validation requirements may be provided to the adaptive communication hardware 104 during manufacture and initial provisioning of the adaptive communication hardware 104, and/or may be provided to the adaptive communication hardware 104 as "updates," as discussed above with reference to 1202.

At 1206, the adaptive communication hardware 104 may receive a jurisdiction identifier from location provider 102 (e.g., from the location agent 108). The jurisdiction identifier may be nominally representative of a jurisdiction in which the adaptive communication hardware 104 is located. The jurisdiction identifier may be received via a wired or wireless network connection, for example. In embodiments in which the location agent 108 and the adaptive communication hardware 104 are included in a common wireless device, the jurisdiction identifier may be provided to the adaptive communication hardware 104 over one or more wired communication pathways through circuit boards included in the wireless device.

At 1208, the adaptive communication hardware 104 (e.g., the jurisdiction identifier evaluation logic 110) may determine whether the jurisdiction identifier received at 1206 is valid by evaluating the received jurisdiction identifier against the jurisdiction identifier validation requirements of 1204. Any of the validation operations discussed above with reference to the jurisdiction identifier evaluation logic 110 may be performed in any combination at 1208.

If the adaptive communication hardware 104 determines at 1208 that the received jurisdiction identifier is valid, the adaptive communication hardware 104 may proceed to 1210, at which the adaptive communication hardware 104 (e.g., the operation constraint application logic 112) may apply the wireless communication operation constraints corresponding to the jurisdiction identifier received at 1206. If the adaptive communication hardware 104 determines at 1208 that the received jurisdiction identifier is invalid, the adaptive communication hardware 104 may proceed to 1212, at which the adaptive communication hardware 104 (e.g., the operation constraint application logic 112) may apply a default set of wireless communication operation constraints.

Figure 13:
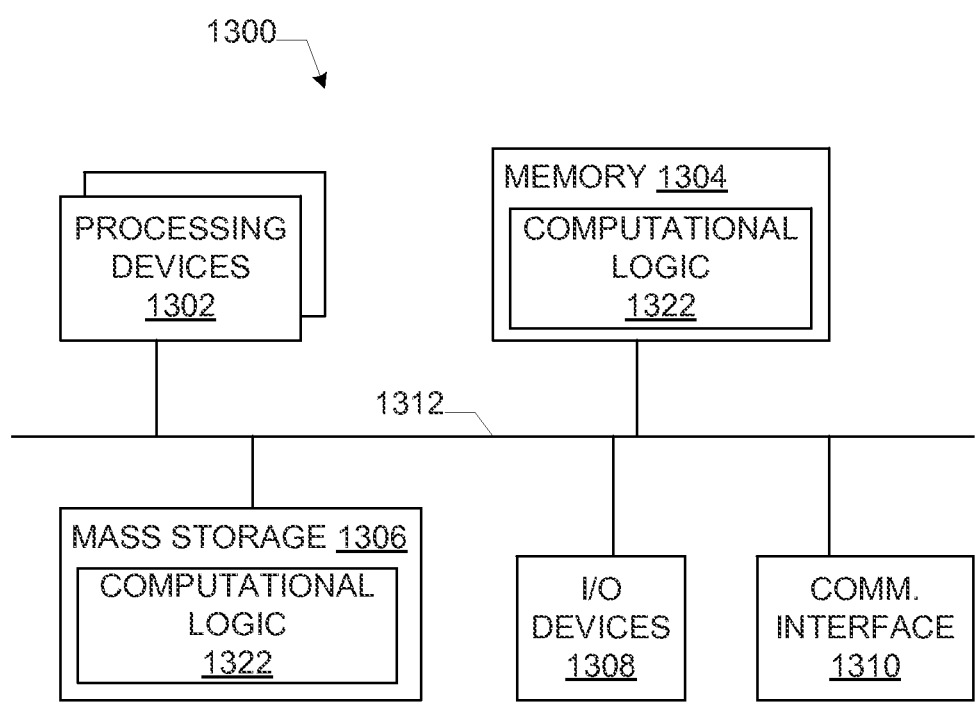
FIG. 13 is a block diagram of an example apparatus suitable for practicing various ones of the disclosed embodiments.

Referring now to FIG. 13, a block diagram is provided of an example apparatus suitable for practicing various ones of the disclosed embodiments. In various embodiments, the apparatus 1300 may be a server, desktop computer, laptop computer, tablet computer, cell phone, smartphone, personal digital assistant, game console, Internet appliance, mobile Internet device, or other computing device. Embodiments of the adaptive communication systems and techniques disclosed herein may be particularly advantageous when the apparatus 1300 is a mobile wireless device, such as a lightweight laptop, a tablet, two-in-one devices that can operate as a tablet or laptop, or a smartphone. Embodiments in which the adaptive communication systems and techniques disclosed herein are implemented in wireless devices that integrate a network interface card into a platform system-on-a-chip may also be advantageous.

As shown, the apparatus 1300 may include a number of processing devices 1302, and a system memory 1304. Any one or more of the processing devices 1302 and the system memory 1304 may be configured to include any of the logic disclosed herein. For example, one or more of the processing devices 1302 and the system memory 1304 may be configured to provide the adaptive communication hardware 104 or the location provider 102. Logic performing the function of any component of the adaptive communication devices disclosed herein may be stored at least in part in the system memory. Additionally, the apparatus 1300 may include mass storage devices 1306 (such as diskette, hard drive, compact disc read-only memory (CD-ROM), and so forth), input/output (I/O) devices 1308 (such as display, keyboard, cursor control, and so forth), and communication interfaces 1310 (such as network interface cards, modems, power amplifiers, and so forth). The elements may be coupled to each other via system bus 1312, which represents one or more buses. In the case of multiple buses, they may be bridged by one or more bus bridges (not shown). In some embodiments, the adaptive communication hardware 104 includes the communication interface 1310 and one or more of the I/O devices 1308 (e.g., antennas, receiving circuitry, and transmitting circuitry). In some embodiments, the sets of wireless communication operation constraints that may be applied based on jurisdiction in accordance with the techniques disclosed herein may be applied to the communication interfaces 1310 and/or one or more of the I/O devices 1308.

Each of these elements may perform its conventional functions known in the art. In particular, the system memory 1304 and the mass storage 1306 may be employed to store a working copy and a permanent copy of the programming instructions implementing the processes of any of FIGS. 10-12, or portions thereof, when executed by the respective processing devices 1302, herein collectively denoted as computational logic 1322. The various components may be implemented by assembler instructions supported by the processing devices 1302 or high-level languages, such as, for example, C, that can be compiled into such instructions. The processing devices 1302 and the system memory 1304 may represent a broad range of processing device and memory arrangements, including arrangements of processing cores of various execution speeds and power consumptions, and memory of various architectures (e.g., with one or more levels of caches) and various types (e.g., dynamic random access, FLASH, etc.).

The permanent copy of the programming instructions may be placed into mass storage 1306 in the factory, or in the field, through, for example, a machine-accessible distribution medium (not shown), such as a compact disc (CD), or through communication interface 1310 (e.g., from a distribution server (not shown)). That is, one or more distribution media having an implementation of an agent program may be employed to distribute the agent program to various computing devices. In some embodiments, logic may be updated in accordance with an updating mechanism. The constitution of elements 1302-1312 is known, and accordingly will not be further described.

Computer readable media (including non-transitory computer readable media, such as computer readable storage media), methods, systems, and devices for performing the above-described techniques are illustrative examples of embodiments disclosed herein. Additionally, other devices in the above-described interactions may be configured to perform various disclosed techniques.

The following paragraphs describe examples of various embodiments disclosed herein. Example 1 is a wireless device for adaptive communication, including: a storage device to store a first memory structure to hold a plurality of identifiers of a corresponding plurality of jurisdictions, a plurality of sets of wireless communication operation constraints, and associations between individual ones of the plurality of jurisdiction identifiers and respective individual ones of the plurality of sets of wireless communication operation constraints; jurisdiction identifier evaluation logic, communicatively coupled to the storage device, to validate or invalidate a received jurisdiction identifier nominally representative of a jurisdiction in which communication hardware of the wireless device is located, wherein to validate the received jurisdiction identifier includes to determine that the received jurisdiction identifier corresponds to one of the stored plurality of jurisdiction identifiers; and operation constraint application logic, communicatively coupled to the storage device and to the jurisdiction identifier evaluation logic, to apply in response to validation of the received jurisdiction identifier, a stored set of wireless communication operation constraints corresponding to the received jurisdiction identifier.

Example 2 may include the subject matter of Example 1, and may further specify that the operation constraint application logic is to, in response to invalidation of the received jurisdiction identifier, apply a default set of wireless communication operation constraints.

Example 3 may include the subject matter of Example 2, and may further specify that the default set of wireless communication operation constraints satisfies all of the plurality of sets of wireless communication operation constraints.

Example 4 may include the subject matter of any of Examples 2-3, and may further specify that to invalidate the received jurisdiction identifier includes to determine that the received jurisdiction identifier does not correspond to one of the stored plurality of jurisdiction identifiers.

Example 5 may include the subject matter of any of Examples 1-4, and may further specify that the storage device is further to store a second memory structure to hold identifiers of one or more trusted location providers, and to validate the received jurisdiction identifier includes to verify that the received jurisdiction identifier was provided by a location provider that corresponds to at least one of the one or more stored trusted location provider identifiers.

Example 6 may include the subject matter of Example 5, and may further specify that to invalidate the received jurisdiction identifier includes to fail to verify that the received jurisdiction identifier was provided by a location provider that corresponds to at least one of the one or more stored trusted location provider identifier.

Example 7 may include the subject matter of any of Examples 2-4, and may further specify that to invalidate the received jurisdiction identifier includes to determine that the received jurisdiction identifier corresponds to an invalid jurisdiction identifier included in the stored plurality of jurisdiction identifiers.

Example 8 may include the subject matter of any of Examples 1-7, and may further specify that at least one of the plurality of sets of wireless communication operation constraints includes an allowed channel of operation, a prohibited channel of operation, a maximal allowed transmit power, or an allowed spectral mask.

Example 9 is a wireless device for adaptive communication, including: a storage device to store a first memory structure to hold a plurality of identifiers of a corresponding plurality of jurisdictions in association with a plurality of location-based jurisdiction definitions, the storage device further to store a second memory structure to hold identifiers of one or more trusted location sources; location validation logic, communicatively coupled to the storage device, to validate or invalidate received location data nominally representative of a location at which communication hardware of the wireless device is located, wherein to validate the received location data includes to verify that the received location data was provided by a location source that corresponds to at least one of the stored trusted location source identifiers; and jurisdiction identification logic, communicatively coupled to the storage device and to the location validation logic, to cause, in response to validation of the received location data, provision of a jurisdiction identifier, corresponding to a location-based jurisdiction definition that includes the received location data, to the communication hardware of the wireless device.

Example 10 may include the subject matter of Example 9, and may further specify that the received location data includes a timestamp, and to validate the received location data includes to determine that the timestamp falls within a predetermined time window of a current time.

Example 11 may include the subject matter of any of Examples 9-10, and may further specify that the received location data includes an indicator of a location accuracy, and to validate the received location data includes to determine that the location accuracy is within a predetermined range.

Example 12 may include the subject matter of any of Examples 9-11, and may further include encryption logic to encrypt and/or sign the jurisdiction identifier prior to provision to the communication hardware.

Example 13 may include the subject matter of any of Examples 9-12, and may further specify that the jurisdiction identification logic, in response to invalidation of the received location data, is to identify a designated invalid jurisdiction identifier and cause provision of the invalid jurisdiction identifier to the communication hardware.

Example 14 may include the subject matter of any of Examples 9-13, and may further specify that the location data include global geolocation coordinates.

Example 15 is one or more computer-readable storage media having instructions thereon that, in response to execution of the instructions by one or more processing devices of a wireless device, cause the wireless device to: store a first memory structure to hold a plurality of identifiers of a corresponding plurality of jurisdictions, a plurality of sets of wireless communication operation constraints, and associations between individual ones of the plurality of jurisdiction identifiers and respective individual ones of the plurality of sets of wireless communication operation constraints; validate or invalidate a received jurisdiction identifier nominally representative of a jurisdiction in which communication hardware of the wireless device is located, wherein validate the received jurisdiction identifier includes determine that the received jurisdiction identifier corresponds to one of the stored plurality of jurisdiction identifiers; and apply, in response to validation of the received jurisdiction identifier, a stored set of wireless communication operation constraints corresponding to the received jurisdiction identifier.

Example 16 may include the subject matter of Example 15, and may further have instructions thereon that, in response to execution of the instructions by the one or more processing devices of the wireless device, cause the wireless device to, in response to invalidation of the received jurisdiction identifier, apply a default set of wireless communication operation constraints.

Example 17 may include the subject matter of any of Examples 15-16, and may further specify that at least one of the plurality of sets of wireless communication operation constraints affects Wi-Fi communication operations of the communication hardware of the wireless device.

Example 18 may include the subject matter of any of Examples 15-17, and may further specify that at least one of the plurality of sets of wireless communication operation constraints affects short-range wireless communication operations of the communication hardware of the wireless device.

Example 19 may include the subject matter of any of Examples 15-18, and may further have instructions thereon that, in response to execution of the instructions by the one or more processing devices of the wireless device, cause the wireless device to store a second memory structure to hold identifiers of one or more trusted location providers, wherein validate the received jurisdiction identifier includes verify that the received jurisdiction identifier was provided by a location provider that corresponds to at least one of the stored trusted location provider identifiers, wherein the jurisdiction identifier is encrypted or signed when received, and verify that the received jurisdiction identifier was provided by a location provider that corresponds to the stored trusted location provider identifier comprises successfully decrypt and/or verify the received jurisdiction identifier.

Example 20 is one or more computer-readable storage media having instructions thereon that, in response to execution of the instructions by one or more processing devices of a wireless device, cause the wireless device to: store a first memory structure to hold a plurality of identifiers of a corresponding plurality of jurisdictions in association with a plurality of location-based jurisdiction definitions; store a second memory structure to hold identifiers of one or more trusted location sources; validate or invalidate received location data nominally representative of a location at which communication hardware of the wireless device is located, wherein validate the received location data includes verify that the received location data was provided by a location source that corresponds to at least one of the stored trusted location source identifiers; and cause, in response to validation of the received location data, provision of a jurisdiction identifier, corresponding to a location-based jurisdiction definition that includes the received location data, to the communication hardware of the wireless device.

Example 21 may include the subject matter of Example 20, and may further have instructions thereon that, in response to execution of the instructions by the one or more processing devices of the wireless device, cause the wireless device to, in response to invalidation of the received location data, identify a designated invalid jurisdiction identifier and cause provision of the invalid jurisdiction identifier to the communication hardware.

Example 22 may include the subject matter of any of Examples 20-21, and may further specify that the location source is a global navigation satellite system device.

Example 23 may include the subject matter of any of Examples 20-22, and may further specify that the location source is a service of an operating system of the wireless device.

Example 24 may include the subject matter of any of Examples 20-23, and may further specify that the location source is a system service of the wireless device.

Example 25 may include the subject matter of any of Examples 20-24, and may further specify that the plurality of jurisdiction identifiers correspond to a plurality of different countries.

Example 26 is a method for adaptive communication in a wireless device, including: storing a first memory structure to hold a plurality of identifiers of a corresponding plurality of jurisdictions, a plurality of sets of wireless communication operation constraints, and associations between individual ones of the plurality of jurisdiction identifiers and respective individual ones of the plurality of sets of wireless communication operation constraints; validating a received jurisdiction identifier nominally representative of a jurisdiction in which communication hardware of the wireless device is located, wherein validating the received jurisdiction identifier includes determining that the received jurisdiction identifier corresponds to one of the stored plurality of jurisdiction identifiers; and applying, in response to validation of the received jurisdiction identifier, a stored set of wireless communication operation constraints corresponding to the received jurisdiction identifier.

Example 27 may include the subject matter of Example 26, and may further include storing a second memory structure to hold identifiers of one or more trusted location providers, wherein validating the received jurisdiction identifier includes verifying that the received jurisdiction identifier was provided by a location provider that corresponds to at least one of the one or more stored trusted location provider identifiers.

Example 28 may include the subject matter of any of Examples 26-27, and may further specify that at least one of the plurality of sets of wireless communication operation constraints includes an allowed channel of operation, a prohibited channel of operation, a maximal allowed transmit power, or an allowed spectral mask.

Example 29 is a method for adaptive communication in a wireless device, including: storing a first memory structure to hold a plurality of identifiers of a corresponding plurality of jurisdictions, a plurality of sets of wireless communication operation constraints, and associations between individual ones of the plurality of jurisdiction identifiers and respective individual ones of the plurality of sets of wireless communication operation constraints; invalidating a received jurisdiction identifier nominally representative of a jurisdiction in which communication hardware of the wireless device is located; and applying, in response to invalidation of the received jurisdiction identifier, a default set of stored wireless communication operation constraints.

Example 30 may include the subject matter of Example 29, and may further specify that the default set of wireless communication operation constraints satisfies all of the plurality of sets of wireless communication operation constraints.

Example 31 may include the subject matter of any of Examples 29-30, and may further specify that invalidating the received jurisdiction identifier includes determining that the received jurisdiction identifier does not correspond to one of the stored plurality of jurisdiction identifiers.

Example 32 may include the subject matter of any of Examples 29-31, and may further specify that invalidating the received jurisdiction identifier includes failing to verify that the received jurisdiction identifier was provided by a location provider that corresponds to at least one of the one or more stored trusted location provider identifier.

Example 33 may include the subject matter of any of Examples 29-32, and may further specify that invalidating the received jurisdiction identifier includes determining that the received jurisdiction identifier corresponds to an invalid jurisdiction identifier included in the stored plurality of jurisdiction identifiers.

Example 34 is a method for adaptive communication in a wireless device, including: storing a first memory structure to hold a plurality of identifiers of a corresponding plurality of jurisdictions in association with a plurality of location-based jurisdiction definitions and storing a second memory structure to hold identifiers of one or more trusted location sources; validating received location data nominally representative of a location at which communication hardware of the wireless device is located, wherein validating the received location data includes verifying that the received location data was provided by a location source that corresponds to at least one of the stored trusted location source identifiers; and causing provision of a jurisdiction identifier, corresponding to a location-based jurisdiction definition that includes the received location data, to the communication hardware of the wireless device.

Example 35 may include the subject matter of Example 34, and may further specify that the received location data includes a timestamp, and validating the received location data includes determining that the timestamp falls within a predetermined time window of a current time.

Example 36 may include the subject matter of any of Examples 34-35, and may further specify that the received location data includes an indicator of a location accuracy, and validating the received location data includes determining that the location accuracy is within a predetermined range.

Example 37 may include the subject matter of any of Examples 34-36, and may further include encrypting or signing the jurisdiction identifier prior to provision to the communication hardware.

Example 38 may include the subject matter of any of Examples 34-37, and may further specify that the location data include global geolocation coordinates.

Example 39 is a method for adaptive communication in a wireless device, including: storing a first memory structure to hold a plurality of identifiers of a corresponding plurality of jurisdictions in association with a plurality of location-based jurisdiction definitions and storing a second memory structure to hold identifiers of one or more trusted location sources; invalidating received location data nominally representative of a location at which communication hardware of the wireless device is located; and in response to invalidating the received location data, identifying a designated invalid jurisdiction identifier and causing provision of the invalid jurisdiction identifier to the communication hardware of the wireless device.

Example 40 is one or more computer-readable storage media having instructions thereon that, in response to execution of the instructions by one or more processing devices of a wireless device, cause the wireless device to perform the method of any of Examples 26-39.

Example 41 is a wireless device for adaptive communication, including: means for storing a first memory structure to hold a plurality of identifiers of a corresponding plurality of jurisdictions, a plurality of sets of wireless communication operation constraints, and associations between individual ones of the plurality of jurisdiction identifiers and respective individual ones of the plurality of sets of wireless communication operation constraints; means for validating a received jurisdiction identifier nominally representative of a jurisdiction in which communication hardware of the wireless device is located, wherein the means for validating the received jurisdiction identifier includes means for determining that the received jurisdiction identifier corresponds to one of the stored plurality of jurisdiction identifiers; and means for applying, in response to validation of the received jurisdiction identifier, a stored set of wireless communication operation constraints corresponding to the received jurisdiction identifier.

Example 42 may include the subject matter of Example 41, and may further include means for storing a second memory structure to hold identifiers of one or more trusted location providers, wherein the means for validating the received jurisdiction identifier includes means for verifying that the received jurisdiction identifier was provided by a location provider that corresponds to at least one of the one or more stored trusted location provider identifiers.

Example 43 may include the subject matter of any of Examples 41-42, and may further specify that at least one of the plurality of sets of wireless communication operation constraints includes an allowed channel of operation, a prohibited channel of operation, a maximal allowed transmit power, or an allowed spectral mask.

Example 44 is a wireless device for adaptive communication, including: means for storing a first memory structure to hold a plurality of identifiers of a corresponding plurality of jurisdictions, a plurality of sets of wireless communication operation constraints, and associations between individual ones of the plurality of jurisdiction identifiers and respective individual ones of the plurality of sets of wireless communication operation constraints; means for invalidating a received jurisdiction identifier nominally representative of a jurisdiction in which communication hardware of the wireless device is located; and means for applying, in response to invalidation of the received jurisdiction identifier, a default set of stored wireless communication operation constraints.

Example 45 may include the subject matter of Example 44, and may further specify that the default set of wireless communication operation constraints satisfies all of the plurality of sets of wireless communication operation constraints.

Example 46 may include the subject matter of any of Examples 44-45, and may further specify that the means for invalidating the received jurisdiction identifier includes means for determining that the received jurisdiction identifier does not correspond to one of the stored plurality of jurisdiction identifiers.

Example 47 may include the subject matter of any of Examples 44-46, and may further specify that the means for invalidating the received jurisdiction identifier includes means for failing to verify that the received jurisdiction identifier was provided by a location provider that corresponds to at least one of the one or more stored trusted location provider identifier.

Example 48 may include the subject matter of any of Examples 44-47, and may further specify that the means for invalidating the received jurisdiction identifier includes means for determining that the received jurisdiction identifier corresponds to an invalid jurisdiction identifier included in the stored plurality of jurisdiction identifiers.

Example 49 is a wireless device for adaptive communication, including: means for storing a first memory structure to hold a plurality of identifiers of a corresponding plurality of jurisdictions in association with a plurality of location-based jurisdiction definitions and storing a second memory structure to hold identifiers of one or more trusted location sources; means for validating received location data nominally representative of a location at which communication hardware of the wireless device is located, wherein the means for validating the received location data includes means for verifying that the received location data was provided by a location source that corresponds to at least one of the stored trusted location source identifiers; and means for causing provision of a jurisdiction identifier, corresponding to a location-based jurisdiction definition that includes the received location data, to the communication hardware of the wireless device.

Example 50 may include the subject matter of Example 49, and may further specify that the received location data includes a timestamp, and the means for validating the received location data includes means for determining that the timestamp falls within a predetermined time window of a current time.

Example 51 may include the subject matter of any of Examples 49-50, and may further specify that the received location data includes an indicator of a location accuracy, and the means for validating the received location data includes determining that the location accuracy is within a predetermined range.

Example 52 may include the subject matter of any of Examples 49-51, and may further include means for encrypting or signing the jurisdiction identifier prior to provision to the communication hardware.

Example 53 may include the subject matter of any of Examples 49-52, and may further specify that the location data include global geolocation coordinates.

Example 54 is a system for adaptive communication in a wireless device, including: means for storing a first memory structure to hold a plurality of identifiers of a corresponding plurality of jurisdictions in association with a plurality of location-based jurisdiction definitions and means for storing a second memory structure to hold identifiers of one or more trusted location sources; means for invalidating received location data nominally representative of a location at which communication hardware of the wireless device is located;

means for identifying, in response to invalidating the received location data, a designated invalid jurisdiction identifier; and means for causing provision of the invalid jurisdiction identifier to the communication hardware of the wireless device.

Example 55 may include the subject matter of any of Examples 15-19, and may further include instructions thereon that, in response to execution of the instructions by the one or more processing devices of the wireless device, cause the wireless device to: store a third memory structure to hold a plurality of identifiers of a corresponding plurality of jurisdictions in association with a plurality of location-based jurisdiction definitions; store a fourth memory structure to hold identifiers of one or more trusted location sources; validate or invalidate received location data nominally representative of a location at which communication hardware of the wireless device is located, wherein validate the received location data comprises verify that the received location data was provided by a location source that corresponds to at least one of the stored trusted location source identifiers; and cause, in response to validation of the received location data, provision of a jurisdiction identifier, corresponding to a location-based jurisdiction definition that includes the received location data, to the communication hardware of the wireless device.

Example 56 may include the subject matter of Example 55, and may further include instructions thereon that, in response to execution of the instructions by the one or more processing devices of the wireless device, cause the wireless device to: in response to invalidation of the received location data, identify a designated invalid jurisdiction identifier and cause provision of the invalid jurisdiction identifier to the communication hardware.

Example 57 may include the subject matter of any of Examples 55-56, and may further specify that the location source is a global navigation satellite system device.

Example 58 may include the subject matter of any of Examples 55-57, and may further specify that the location source is a service of an operating system of the wireless device.

Example 59 may include the subject matter of any of Examples 55-58, and may further specify that the location source is a system service of the wireless device.

Example 60 may include the subject matter of any of Examples 55-59, and may further specify that the plurality of jurisdiction identifiers correspond to a plurality of different countries.

What is claimed is:

1. A wireless device for adaptive communication, comprising:
    a storage device to store a first memory structure to hold a plurality of identifiers of a corresponding plurality of jurisdictions, a plurality of sets of wireless communication operation constraints, and associations between individual ones of the plurality of jurisdiction identifiers and respective individual ones of the plurality of sets of wireless communication operation constraints, and the storage device is further to store a second memory structure to hold identifiers of one or more trusted location providers;
    jurisdiction identifier evaluation logic, communicatively coupled to the storage device, to validate or invalidate a received jurisdiction identifier nominally representative of a jurisdiction in which communication hardware of the wireless device is located, wherein to validate the received jurisdiction identifier comprises to determine that the received jurisdiction identifier corresponds to one of the stored plurality of jurisdiction identifiers and was provided by a location provider that corresponds to at least one of the one or more stored trusted location provider identifiers; and
    operation constraint application logic, communicatively coupled to the storage device and to the jurisdiction identifier evaluation logic, to apply in response to validation of the received jurisdiction identifier, a stored set of wireless communication operation constraints corresponding to the received jurisdiction identifier.

2. The wireless device of claim 1, wherein:
    the operation constraint application logic is to, in response to invalidation of the received jurisdiction identifier, apply a default set of wireless communication operation constraints.

3. The wireless device of claim 2, wherein the default set of wireless communication operation constraints satisfies all of the plurality of sets of wireless communication operation constraints.

4. The wireless device of claim 2, wherein to invalidate the received jurisdiction identifier comprises to determine that the received jurisdiction identifier does not correspond to one of the stored plurality of jurisdiction identifiers.

5. The wireless device of claim 1, wherein to invalidate the received jurisdiction identifier comprises to fail to verify that the received jurisdiction identifier was provided by a location provider that corresponds to at least one of the one or more stored trusted location provider identifiers.

6. The wireless device of claim 2, wherein to invalidate the received jurisdiction identifier comprises to determine that the received jurisdiction identifier corresponds to an invalid jurisdiction identifier included in the stored plurality of jurisdiction identifiers.

7. The wireless device of claim 1, wherein at least one of the plurality of sets of wireless communication operation constraints includes an allowed channel of operation, a prohibited channel of operation, a maximal allowed transmit power, or an allowed spectral mask.

8. A wireless device for adaptive communication, comprising:
    a storage device to store a first memory structure to hold a plurality of identifiers of a corresponding plurality of jurisdictions in association with a plurality of location-based jurisdiction definitions, the storage device further to store a second memory structure to hold identifiers of one or more trusted location sources;
    location validation logic, communicatively coupled to the storage device, to validate or invalidate received location data nominally representative of a location at which communication hardware of the wireless device is located, wherein to validate the received location data comprises to verify that the received location data was provided by a location source that corresponds to at least one of the stored trusted location source identifiers; and
    jurisdiction identification logic, communicatively coupled to the storage device and to the location validation logic, to cause, in response to validation of the received location data, provision of a jurisdiction identifier, corresponding to a location-based jurisdiction definition that includes the received location data, to the communication hardware of the wireless device.

9. The wireless device of claim 8, wherein the received location data includes a timestamp, and to validate the received location data comprises to determine that the timestamp falls within a predetermined time window of a current time.

10. The wireless device of claim 8, wherein the received location data includes an indicator of a location accuracy, and to validate the received location data comprises to determine that the location accuracy is within a predetermined range.

11. The wireless device of claim 8, further comprising encryption logic to encrypt or sign the jurisdiction identifier prior to provision to the communication hardware.

12. The wireless device of claim 8, wherein:
the jurisdiction identification logic, in response to invalidation of the received location data, is to identify a designated invalid jurisdiction identifier and cause provision of the invalid jurisdiction identifier to the communication hardware.

13. The wireless device of claim 8, wherein the location data include global geolocation coordinates.

14. One or more non-transitory computer-readable storage media having instructions thereon that in response to execution of the instructions by one or more processing devices of a wireless device, cause the wireless device to:
store a first memory structure to hold a plurality of identifiers of a corresponding plurality of jurisdictions, a plurality of sets of wireless communication operation constraints, and associations between individual ones of the plurality of jurisdiction identifiers and respective individual ones of the plurality of sets of wireless communication operation constraints, and store a second memory structure to hold identifiers of one or more trusted location providers;
validate or invalidate a received jurisdiction identifier nominally representative of a jurisdiction in which communication hardware of the wireless device is located, wherein to validate the received jurisdiction identifier, the wireless device, in response to execution of the instructions, is to determine that the received jurisdiction identifier corresponds to one of the stored plurality of jurisdiction identifiers, and determine that the received jurisdiction identifier was provided by a location provider that corresponds to at least one of the stored trusted location provider identifiers; and
apply, in response to validation of the received jurisdiction identifier, a stored set of wireless communication operation constraints corresponding to the received jurisdiction identifier.

15. The one or more non-transitory computer-readable storage media of claim 14, further having instructions thereon that, in response to execution of the instructions by the one or more processing devices of the wireless device, cause the wireless device to:
in response to invalidation of the received jurisdiction identifier, apply a default set of wireless communication operation constraints.

16. The one or more non-transitory computer-readable storage media of claim 14, wherein at least one of the plurality of sets of wireless communication operation constraints affects Wi-Fi communication operations of the communication hardware of the wireless device.

17. The one or more non-transitory computer-readable storage media of claim 14, wherein at least one of the plurality of sets of wireless communication operation constraints affects short-range wireless communication operations of the communication hardware of the wireless device.

18. The one or more non-transitory computer-readable storage media of claim 14, wherein the jurisdiction identifier is encrypted or signed when received, and in response to execution of the instructions by the one or more processing devices of the wireless device, the wireless device is to:
verify that the received jurisdiction identifier provided by the location provider that corresponds to the stored trusted location provider identifier comprises a successfully decrypted or authenticated jurisdiction identifier.

19. The one or more non-transitory computer-readable storage media of claim 14, further having instructions thereon that, in response to execution of the instructions by one or more processing devices of a wireless device, cause the wireless device to:
store a third memory structure to hold a plurality of identifiers of a corresponding plurality of jurisdictions in association with a plurality of location-based jurisdiction definitions;
store a fourth memory structure to hold identifiers of one or more trusted location sources;
validate or invalidate received location data nominally representative of a location at which communication hardware of the wireless device is located, wherein validate the received location data includes verify that the received location data was provided by a location source that corresponds to at least one of the stored trusted location source identifiers; and
cause, in response to validation of the received location data, provision of a jurisdiction identifier, corresponding to a location-based jurisdiction definition that includes the received location data, to the communication hardware of the wireless device.

20. The one or more non-transitory computer-readable storage media of claim 19, further having instructions thereon that, in response to execution of the instructions by the one or more processing devices of the wireless device, cause the wireless device to:
in response to invalidation of the received location data, identify a designated invalid jurisdiction identifier and cause provision of the invalid jurisdiction identifier to the communication hardware.

21. The one or more non-transitory computer-readable storage media of claim 19, wherein the location source is a global navigation satellite system device.

22. The one or more non-transitory computer-readable storage media of claim 19, wherein the location source is a service of an operating system of the wireless device.

23. The one or more non-transitory computer-readable storage media of claim 19, wherein the location source is a system service of the wireless device.

24. The one or more non-transitory computer-readable storage media of claim 19, wherein the plurality of jurisdiction identifiers correspond to a plurality of different countries.

25. One or more non-transitory computer-readable storage media having instructions thereon that, in response to execution of the instructions by one or more processing devices of a wireless device, cause the wireless device to:
store a first memory structure to hold a plurality of identifiers of a corresponding plurality of jurisdictions in association with a plurality of location-based jurisdiction definitions;
store a second memory structure to hold identifiers of one or more trusted location sources;
validate or invalidate received location data nominally representative of a location at which communication hardware of the wireless device is located, wherein validate the received location data includes verify that the received location data was provided by a location source that corresponds to at least one of the stored trusted location source identifiers; and
cause, in response to validation of the received location data, provision of a jurisdiction identifier, corresponding to a location-based jurisdiction definition that includes the received location data, to the communication hardware of the wireless device.

26. The one or more non-transitory computer-readable storage media of claim 25, further having instructions thereon that, in response to execution of the instructions by the one or more processing devices of the wireless device, cause the wireless device to:

in response to invalidation of the received location data, identify a designated invalid jurisdiction identifier and cause provision of the invalid jurisdiction identifier to the communication hardware.

27. The one or more non-transitory computer-readable storage media of claim 25, wherein the location source is a global navigation satellite system device.

28. The one or more non-transitory computer-readable storage media of claim 25, wherein the location source is a service of an operating system of the wireless device.

29. The one or more non-transitory computer-readable storage media of claim 25, wherein the plurality of jurisdiction identifiers correspond to a plurality of different countries.

* * * * *